(12) United States Patent
Payne et al.

(10) Patent No.: US 6,323,771 B1
(45) Date of Patent: Nov. 27, 2001

(54) METHOD OF IDENTIFYING ANIMALS VIA UNIVERSAL IDENTIFICATION SCHEME

(76) Inventors: James S. Payne, 3009 Bryant Ave. South, Minneapolis, MN (US) 55408; John M. Semmer, 7970 County Road 26, Maple Plain, MN (US) 55359; John P. Weiser, 16323 Temple Terr., Minnetonka, MN (US) 55345

( * ) Notice: Subject to any disclaimer, the term of this patent is extended or adjusted under 35 U.S.C. 154(b) by 0 days.

(21) Appl. No.: 09/545,386

(22) Filed: Apr. 7, 2000

Related U.S. Application Data

(60) Provisional application No. 60/128,470, filed on Apr. 9, 1999.

(51) Int. Cl.[7] ................................................... G08B 23/00
(52) U.S. Cl. ..................................... 340/573.1; 340/572.7; 340/572.1; 340/825.34; 340/825.54; 340/10.1; 340/10.33
(58) Field of Search ............................. 340/573.1, 572.7, 340/10.33, 572.1, 825.34, 10.1, 825.54, 447; 235/462.09, 462.1

(56) References Cited

U.S. PATENT DOCUMENTS

| | | | |
|---|---|---|---|
| 5,252,962 | * 10/1993 | Urbas et al. | 340/870.17 |
| 5,936,542 | * 8/1999 | Kleinrock et al. | 340/825.34 |
| 5,973,598 | * 10/1999 | Beigel | 340/572.1 |
| 6,061,344 | * 5/2000 | Wood, Jr. | 370/346 |

* cited by examiner

*Primary Examiner*—Daniel J. Wu
*Assistant Examiner*—Tai T. Nguyen
(74) *Attorney, Agent, or Firm*—Jonathan Spangler

(57) ABSTRACT

The present disclosure involves a method of identifying animals involving the use of a universal identification scheme capable of identifying individual animals anywhere in the world such that data may collected for the animals over their entire life cycle.

34 Claims, 9 Drawing Sheets

METHOD OF IDENTIFYING ANIMALS VIA UNIVERSAL IDENTIFICATION SCHEME

This application claims benefit of Ser. No. 60/128,470 filed on Apr. 9, 1999

BACKGROUND OF THE INVENTION

I. Field of the Invention

This invention relates generally to a method of uniquely identifying animals for data collection, records management and retrieval purposes. More particularly, the present invention relates to a method of identifying animals which involves the use of a universal identification scheme capable of uniquely identifying individual animals anywhere in the world such that data may collected for the animals over their entire life cycle (defined as the period from birth to death and all post-death processing).

II. Discussion of the Prior Art

Animal identification and registry has been an area of increasing concern over recent years. Generally speaking, animal identification and registry involves collecting data for each animal throughout its entire life cycle such that the individual characteristics and history of the animal can be tracked. This data may include, but is not necessarily limited to, date and place of birth, ancestry, sex, geographic movement, health and treatment history, and other production records. The livestock and food processing industries, in particular, has been heavily involved in this area in an effort to increase productivity and profitability in livestock management, as well as develop a strategy for identifying, tracing and managing the risks in the area of food safety and infectious disease outbreaks in livestock.

A significant challenge exists, however, in that there is currently no uniform system for identifying the animals to be tracked. Instead, a multitude of animal identification and registry conventions have evolved over time which vary widely depending upon, for example, the geographic location of the livestock operation and/or the manufacturer of the particular animal tracking system. The lack of uniformity based on geographic location is evident, by way of example, in the United States, wherein each state determines its own animal identification scheme for livestock farms located within the state. This lack of uniformity is problematic in that it becomes increasingly difficult to trace back information concerning a specific animal. In this fashion, the usefulness of the collected data is compromised, which undercuts the goal of increasing productivity. It also increases the time required to trace back human exposure and potential issues of food safety while limiting the spread of infectious diseases which, in certain circumstances, can lead to additional exposure to preventable health risks for humans and the spread of confinable diseases for animals which in turn could lead to the disposal of large numbers of animals. As will be appreciated, this is not only disadvantageously costly, but also problematic in terms of the additional health risks presented to humans and animals alike. Managing the risk is clearly associated with data collection and information management systems that a well run animal operation should already have in place.

The present invention is directed at overcoming, or at least reducing the effects of, one or more of the problems set forth above.

SUMMARY OF THE INVENTION

In accordance with a broad aspect of the present invention, a method is provided for identifying animals. The first step involves providing a unique universal identification character sequence (UUICS). The unique universal identification character sequence includes a first block of characters representing a primary geographic location, a second block of characters representing a secondary geographic location within the primary geographic location, a third block of characters representing a tertiary geographic location within the secondary geographic location, a fourth block of characters representing a quaternary geographic location within the tertiary geographic location within which an animal is disposed, and a fifth block of characters representing a unique identifier for the animal within the quaternary geographic location. The second step of the method involves equipping each animal within the quaternary geographic location with a carrier carrying a unique universal identification character sequence for the animal.

In accordance with another broad aspect of the present invention, a method of identifying animals is provided comprising the steps of: (a) assigning a first block of characters to an animal representing a primary geographic location wherein the animal is disposed; (b) assigning a second block of characters to the animal representing a secondary geographic location within the primary geographic location wherein the animal is disposed; (c) assigning a third block of characters to the animal representing a tertiary geographic location within the secondary geographic location wherein the animal is disposed; (d) assigning a fourth block of characters to the animal representing a quaternary geographic location within the tertiary geographic location wherein the animal is disposed; (e) assigning a fifth block of characters to the animal representing a unique identifier for the animal disposed within the quaternary geographic location; (f) combining the characters in steps (a)–(e) to produce a unique universal identification character sequence for the animal within the quaternary geographic location; and (g) equipping the animal with a carrier carrying the unique universal identification character sequence for the animal.

In a still further broad aspect of the present invention, a method of identifying animals is provided, wherein the animals are disposed within a quaternary geographic location which forms part of a tertiary geographic location which forms part of a secondary geographic location which forms part of a primary geographic location. The method comprises the first step of providing a unique universal identification character sequence for each animal within the quaternary geographic location. The second step of the method involves equipping each of the animals with a carrier carrying the unique universal identification character sequence.

BRIEF DESCRIPTION OF THE DRAWINGS

Other objects and advantages of the invention will become apparent upon reading the following detailed description and upon reference to the drawings in which.

DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
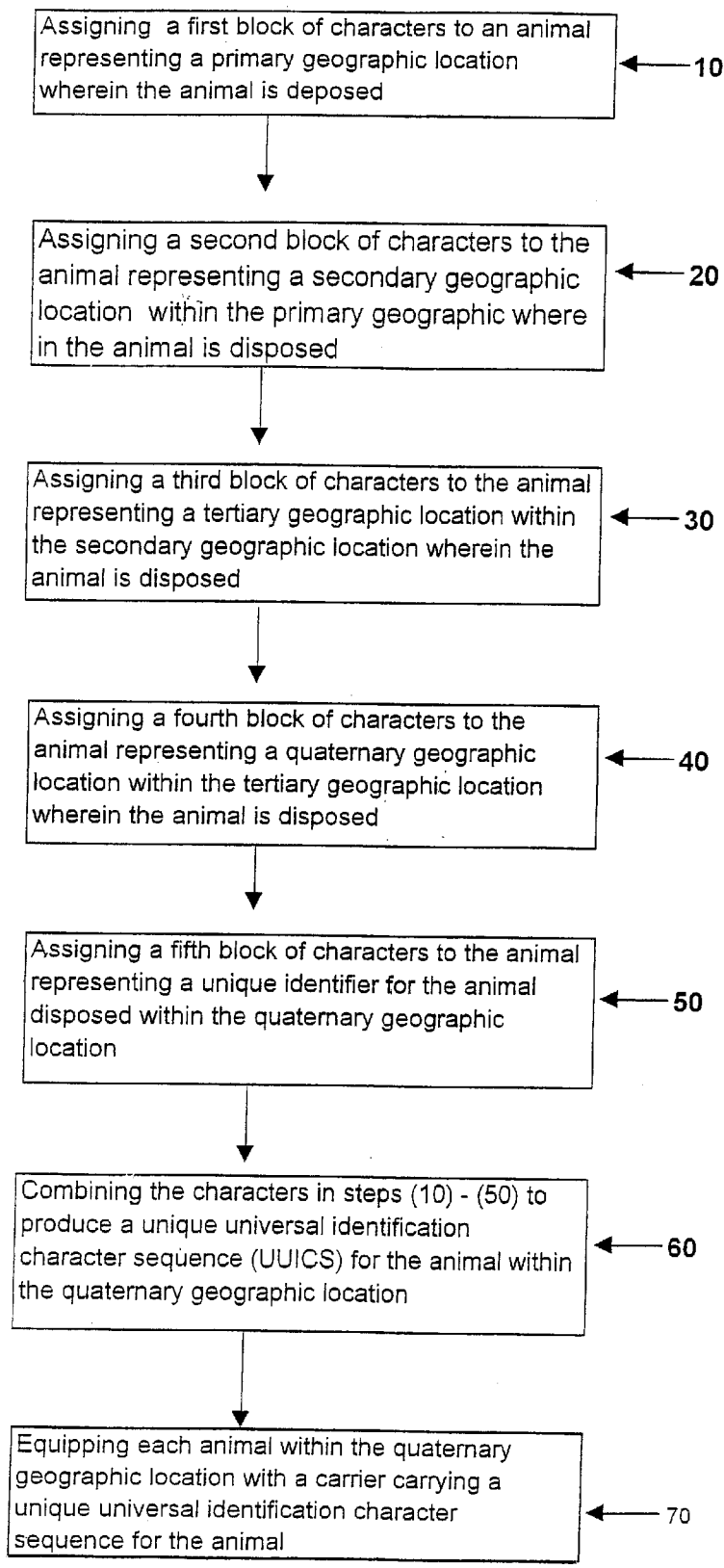
FIG. 1 is a block diagram illustrating the steps of the method of identifying animals in accordance with a preferred embodiment of the present invention.

Referring initially to FIG. 1, shown is block diagram illustrating the steps of the method of identifying animals in accordance with one embodiment of the present invention. As will be explained in greater detail below, the method of the present invention provides the ability to uniquely identify animals in a uniform and consistent fashion regardless of their geographic location such that the data collected for each animal can be quickly and easily accessed. The present invention thus minimizes the amount of time required to trace back diseases, thereby reducing the risk of having disease-free animals become infected, and reducing the associated health risks to humans. The method of present invention is also advantageous in that it provides the ability to identify animals regardless of the manufacturer of the particular animal tracking system employed by the livestock concern. This allows the livestock producer(s) and food processors to more easily collect and track data on an individual animal during its life cycle providing for increased productivity and protecting the general health and well being of workers, consumers and animals.

The present invention accomplishes the foregoing advantages by providing a unique universal identification character sequence (UUICS) for each animal within any given geographical locale according to the following steps. Step 10 involves assigning a first block of characters to an animal representing a primary geographic location wherein the animal is disposed. Step 20 involves assigning a second block of characters to the animal representing a secondary geographic location within the primary geographic location wherein the animal is disposed. Step 30 involves assigning a third block of characters to the animal representing a tertiary geographic location within the secondary geographic location wherein the animal is disposed. Step 40 involves assigning a fourth block of characters to the animal representing a quaternary geographic location within the tertiary geographic location wherein the animal is disposed. Step 50 involves assigning a fifth block of characters to the animal representing a unique identifier for the animal disposed within the quaternary geographic location. Step 60 involves combining the characters in steps 10–50 to produce the unique universal identification character sequence (UUICS) for the animal within the quaternary geographic location. Although not shown, an optional block of characters may be included in the unique universal identification character sequence (UUICS) representing a characteristic of the animal, such as animal type and animal class. Each character block in the unique universal identification character sequence (UUICS) of the present invention may comprise any combination of alphabetical and/or numeric characters.

In a preferred embodiment of the present invention, the "primary geographic location" may be any one of a variety of countries throughout the world, the "secondary geographic location" may be a state or province within the selected country, the "tertiary geographic location" may be a county or other municipality within the selected state or province, and the "quaternary geographic location" may be a farm or other premises within the selected county or other municipality on which the animal is physically located. The "unique identifier" assigned to each animal located on the selected farm or other premises may comprise any combination of alphabetical and/or numeric characters for identifying the particular animal within the overall animal population on the selected farm or other premises. In this fashion, the method of the present invention is capable of pinpointing the current physical location and movement of any animal worldwide. This provides the ability to track and maintain accurate records as to each animal within a particular herd or premises, and ensures the integrity of the tracking system by preventing the issuance of duplicate tags. As noted above, the unique universal identification character sequence (UUICS) of the present invention may also designate a "characteristic of the animal" which, in a preferred embodiment, may comprise animal type or animal class.

Figure 2:
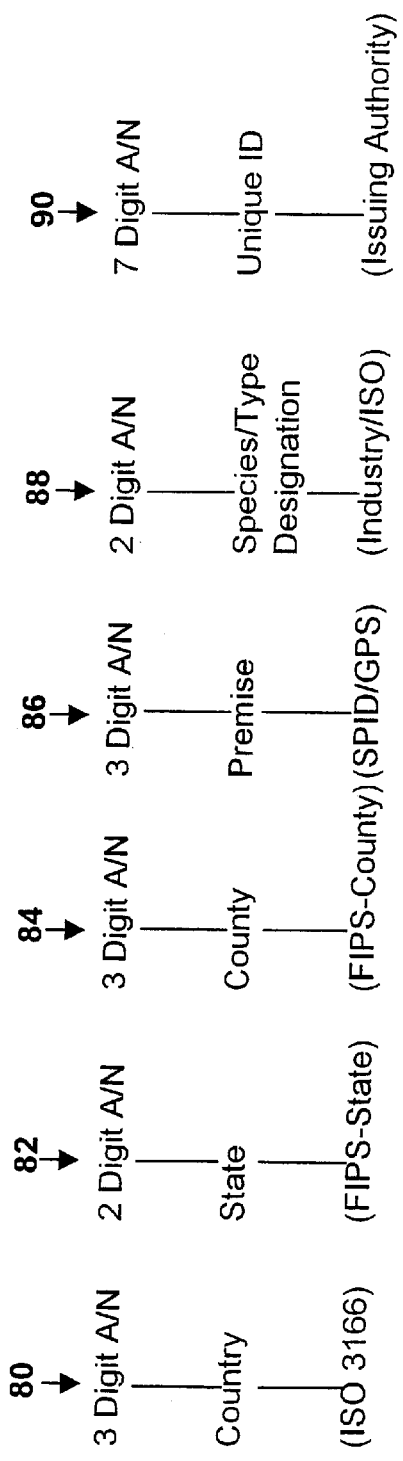
FIG. 2 is a table illustrating the components of a unique universal identification character sequence (UUICS) provided in accordance with one embodiment of the present invention.

In accordance with the present invention, the foregoing animal identification information of the unique universal identification character sequence (UUICS) may be represented in any number of suitable fashions. For example, with reference to FIG. 2, the first block of characters 80 (which represents a primary geographic location, i.e. a country) may comprise a three (3) character numeric code, such as the country codes established by the International Organization of Standardization in ISO 3166 as shown in Table 1 below. The second block of characters 82 (which represents a secondary geographic location, i.e. a state or province within the selected country) may comprise a two (2) character numeric code, such as the Federal Information Processing System (FIPS) state-level codes established by the U.S. government as shown in Table 2 below. The third block of characters 84 (which represents a tertiary geographic location, i.e. a county or other municipality within the selected state or province) may comprise a three (3) character numeric code, such as the FIPS county-level codes established by the U.S. government as shown in Table 3 below. It is to be readily understood that the FIPS state and county level codes are provided by way of example only, and that similar codes may be employed to designate the particular states or provinces and counties or municipalities, respectively, for particular the country of interest.

The fourth block of characters 86 (which represents the quaternary geographic location of the animal within the tertiary geographic location) may comprise a three (3) character numeric code capable of designating a farm or similar premises, or a particular herd, within the selected county or other municipality. By way of example only, this three character code 86 may be a numeric code established through the use of a global positioning system (GPS) to determine the physical location of the animal at issuance of its unique universal identification character sequence (UUICS). The fourth block of characters 86 may alternatively comprise a three (3) character code established as part of a State Premise Identification (SPID) system, well known in the art. The optional block of characters 88 may, in one embodiment, comprise a two (2) character alphabetical and/or numeric code representing any of a variety of characteristics of the animal, such as sex, species, type, or class.

The fifth block of characters 90 (which represents a unique identifier for a specific animal disposed within the selected physical location within the quaternary geographic location, i.e. on the selected farm or part of the selected herd within the county or other municipality) preferably comprises a seven (7) character alphabetical and/or numeric code capable of identifying a given animal within the overall animal population of the particular farm, premises, or herd. In one preferred embodiment, this seven (7) character code 90 may comprise a sequential numbering progression which increases for each animal within the overall animal population. Based on the foregoing, then, the unique universal identification character sequence (UUICS) according to one embodiment of the present invention is twenty (20) characters in length.

Figure 3A:
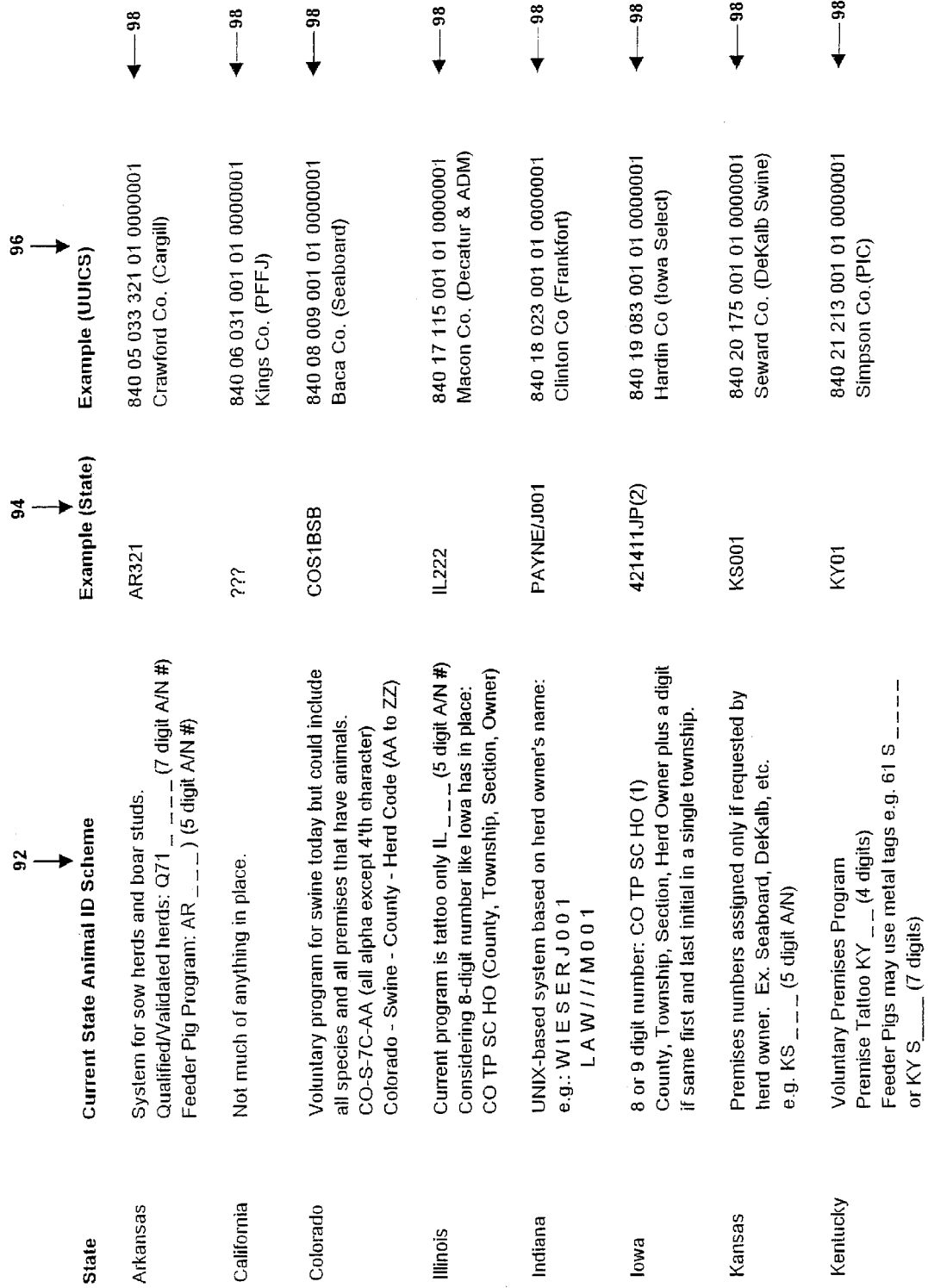
FIGS. 3A–3C are tables illustrating a comparison between the animal identification schemes used by various states within the U.S. vs. the UUICS animal identification scheme provided in accordance with one embodiment of the present invention.
Figure 3B:
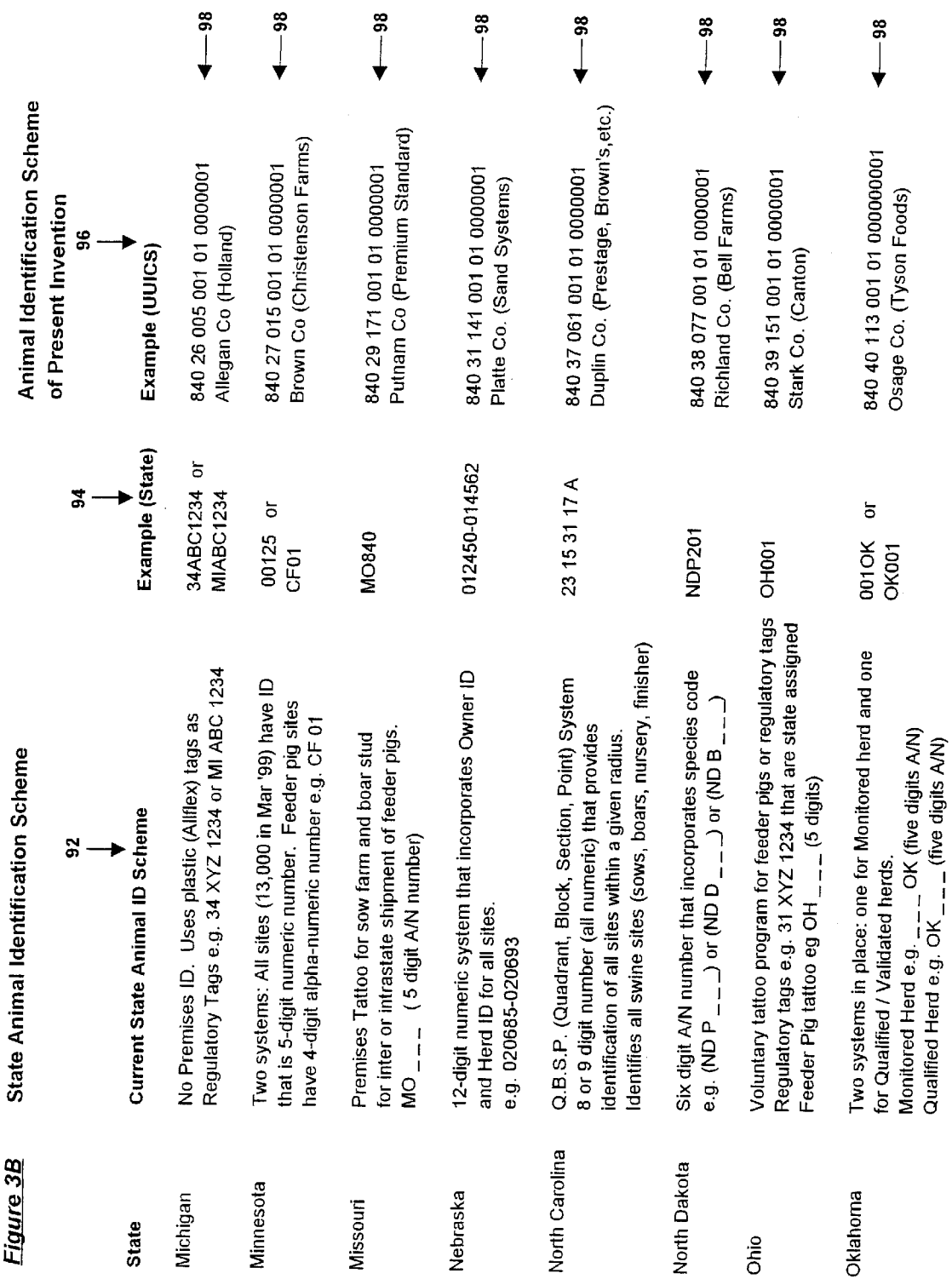
Figure 3C:
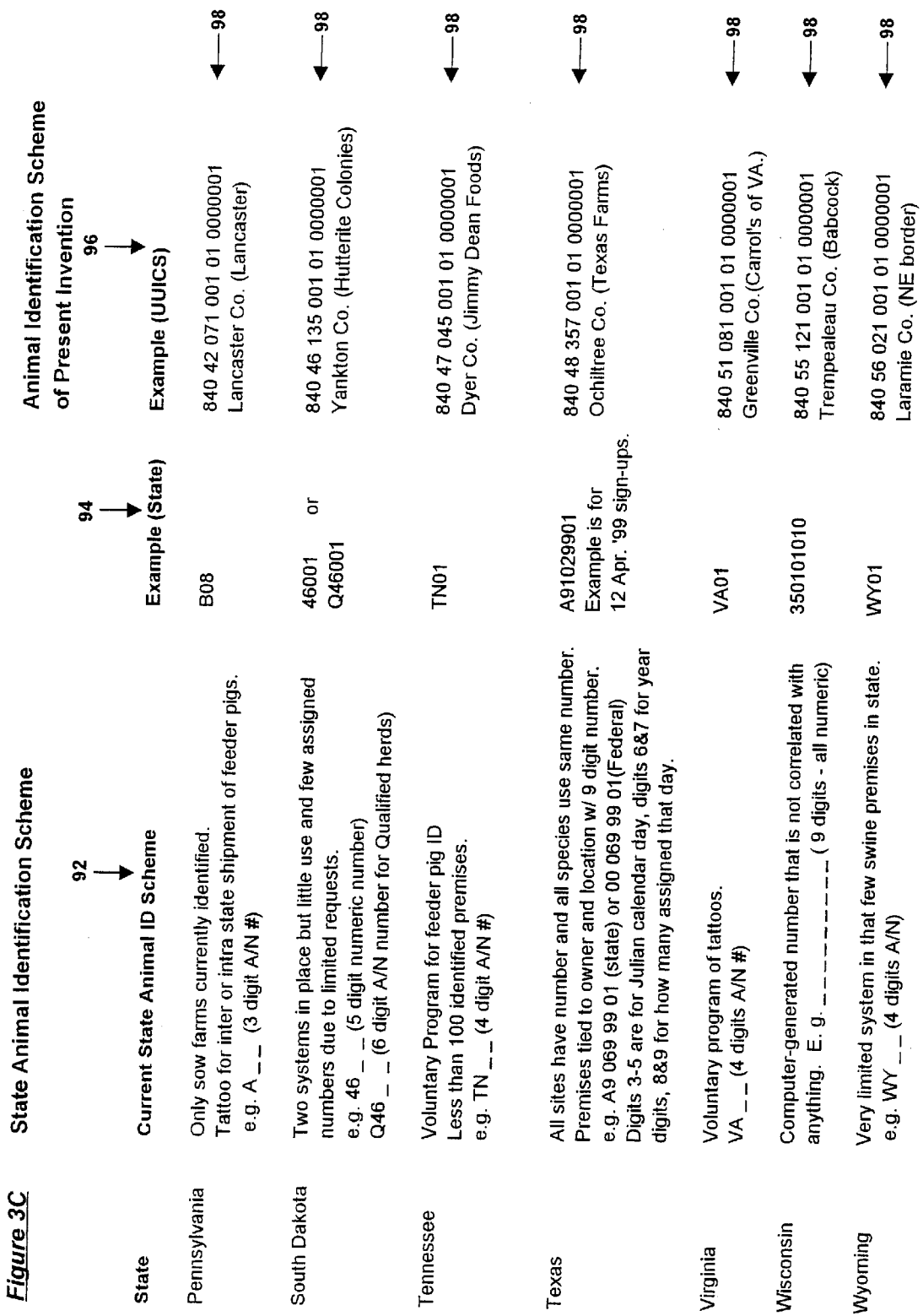

The universal nature of the present invention is particularly evident when compared to the animal identification schemes of the prior art. With reference to FIGS. 3A–3C, shown by way of example is a comparison between the prior art animal identification schemes employed by various states within the U.S. (for swine) versus the UUICS animal identification scheme of the present invention. As shown in column 92, the animal identification schemes vary widely between the states such that there is little, if any, consistency or uniformity between the corresponding state animal identification sequences shown in column 94. This lack of uniformity creates difficulty in coordinating and tracking data obtained for a particular animal or premises which, as noted above, increases the overall time required to access important animal information. This is particularly troublesome during disease and food safety outbreaks where a failure to pin-point disease information in a timely fashion can translate into substantial losses of human life and livestock, and consequently disruption and fear for the safety of our food supply and the economics of stable livestock production.

The animal identification scheme of the present invention, as shown in column 96, overcomes the drawbacks of the prior art by providing a corresponding unique universal identification character sequence (UUICS) 98 comprising a twenty (20) character code which, by way of example only, is numerical. This twenty (20) character UUICS of the present invention is advantageous in that it provides all the information necessary to identify specific animals in a wide variety of geographical locations in a uniform fashion. The uniformity allows for quick and easily data retrieval for a given animal's life cycle, thereby aiding the ability to trace food safety issues and disease information, as well as facilitating improved productivity for the livestock producer.

Figure 4:
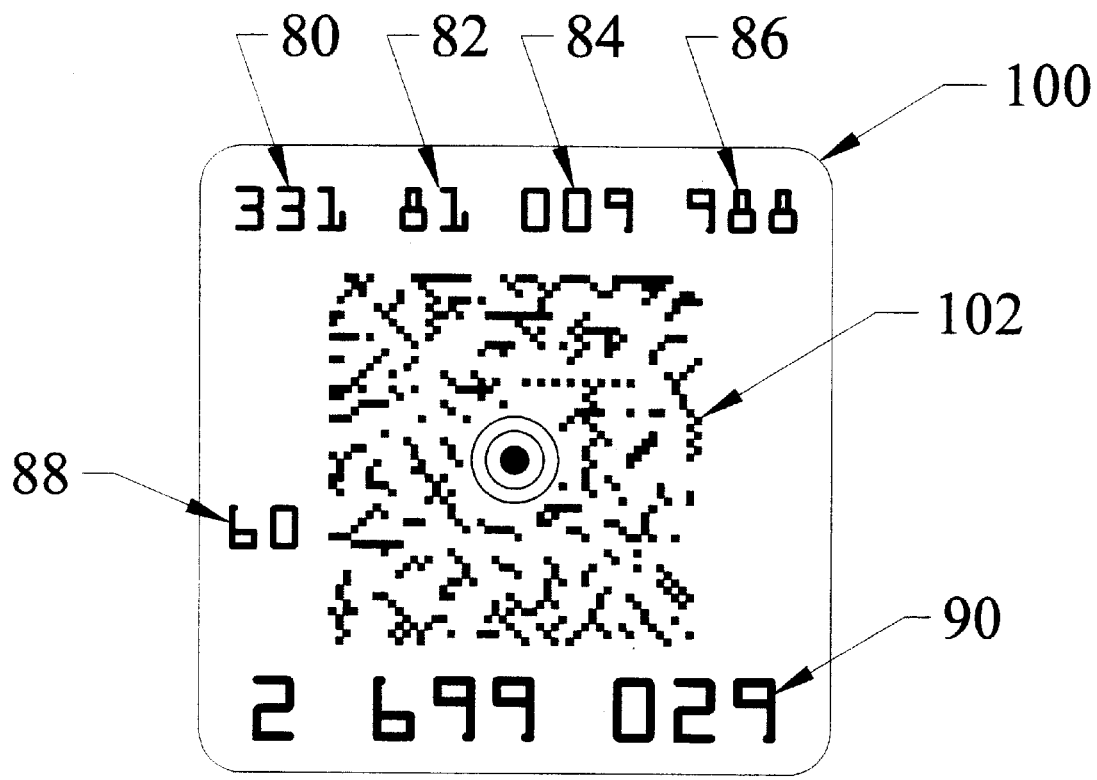
FIG. 4 is a planar view of the surface of an identification tag having a unique universal identification character sequence (UUICS) provided in accordance with the present invention disposed as both a machine-readable two-dimensional barcode and a human or visually-readable twenty (20) character numeric code.
Figure 5:
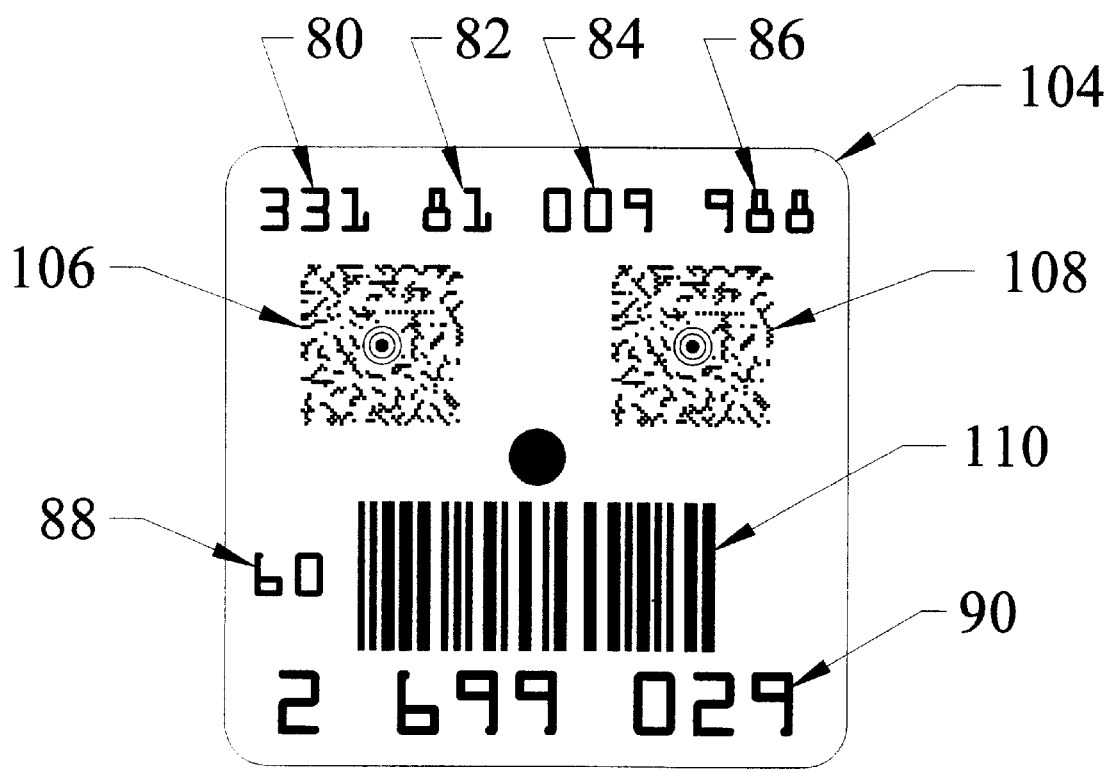
FIG. 5 is a planar view of the surface of an identification tag having a unique universal identification character sequence (UUICS) provided in accordance with the present invention disposed as a machine-readable linear barcode, a pair of machine-readable two-dimensional barcodes, and a human or visually-readable twenty (20) character numeric code.

The unique universal identification character sequence (UUICS) provided in accordance with the method of the present invention must physically accompany each animal in order to effectuate the desired goals of improved traceability and increased productivity. However, the benefits and advantages of the present invention occur independent of the manner in which this is accomplished such that virtually any carrier medium may be used to maintain the UUICS information with a given animal. For example, with reference to FIG. 4, shown is the surface of an ear tag 100 having a unique uniform identification character sequence (UUICS) disposed thereon in both a machine-readable two-dimensional barcode 102 and a human or visually-readable twenty (20) digit UUICS comprising a three (3) digit country code 80, a two (2) digit state code 82, a three (3) digit county code 84, a three (3) digit premises code 86, a two (2) digit "animal characteristic" code 88, and a seven (7) digit unique identifier 90. In similar fashion, with reference to FIG. 5, shown is the surface of an ear tag 104 having a unique uniform identification character sequence (UUICS) disposed thereon as a pair of machine-readable two-dimensional barcodes 106, 108, a machine-readable linear barcode 110, and a human or visually-readable twenty (20) digit UUICS comprising a three (3) digit country code 80, a two (2) digit state code 82, a three (3) digit county code 84, a three (3) digit premises code 86, a two (2) digit "animal characteristic" code 88, and a seven (7) digit unique identifier 90.

Figure 6:
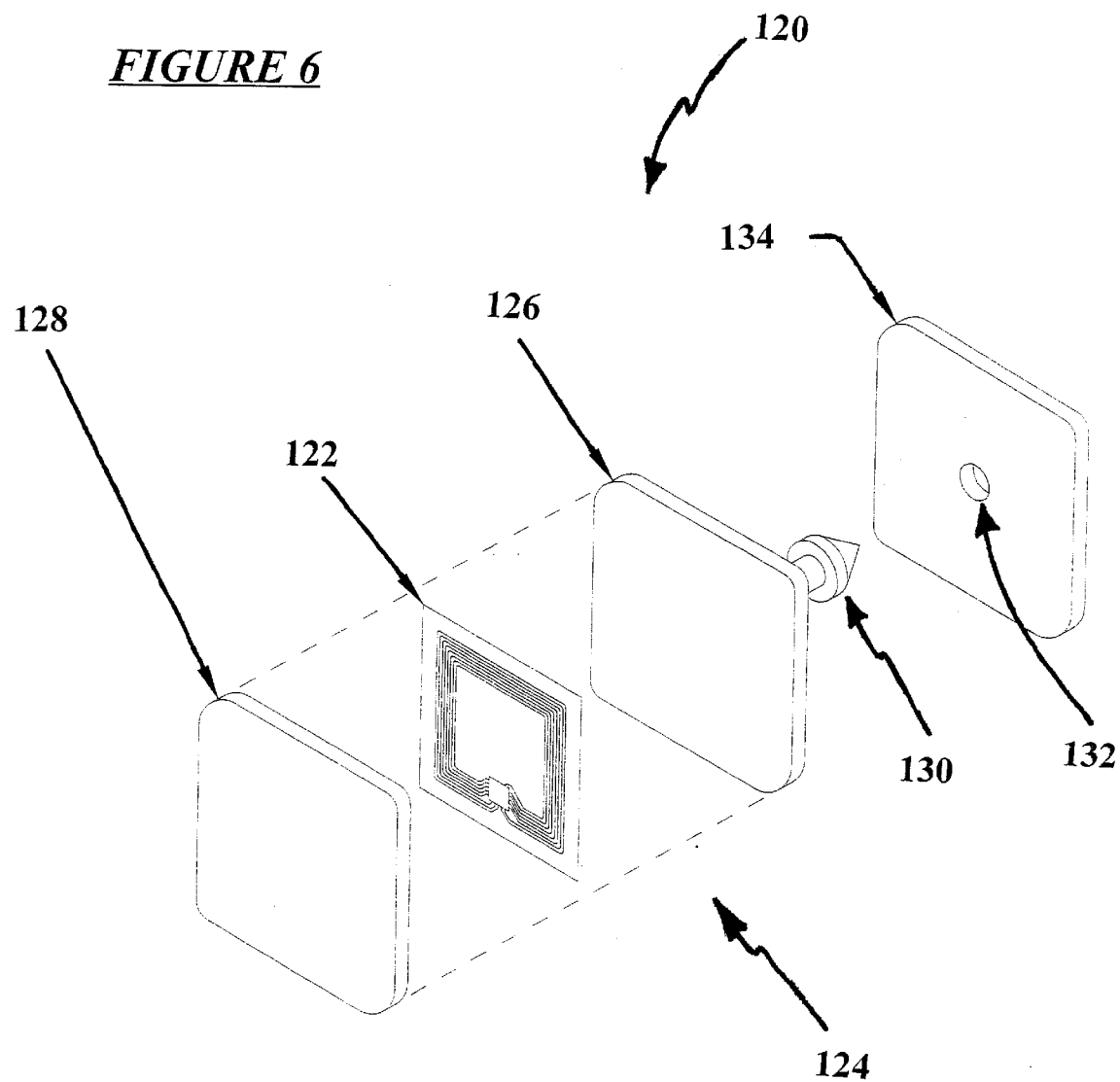
FIG. 6 is an exploded perspective view of a tag assembly according to the present invention having a transponder capable of carrying and transmitting a unique universal identification character sequence (UUICS) provided in accordance with the present invention.
Figure 7:
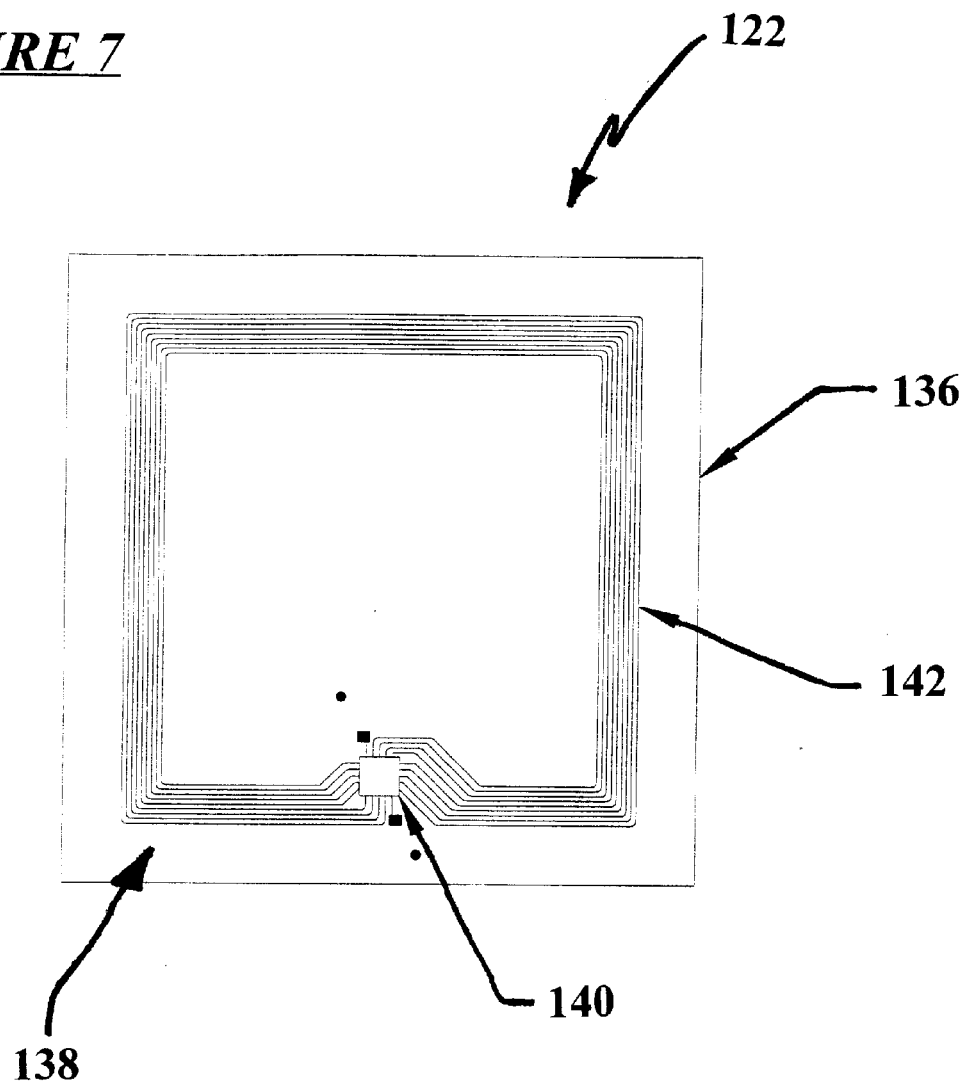
FIG. 7 is an enlarged planar view of the transponder shown in FIG. 6 illustrating the transmitter circuit (antenna and microchip) and substrate which form the transponder.

It is to be readily understood that the medium or mechanism for equipping the animal with the unique universal identification character sequence (UUICS) of the present invention may be effectuated in any number of different fashions. For example, the unique universal identification character sequence (UUICS) may be disposed within, formed as a part of, or otherwise provided with any number of carrier devices, including but not limited to transponders, data gliffs, and three-dimensional communication media. FIGS. 6–7 illustrate one such exemplary carrier device, comprising a tag assembly 120 having a transponder 122 capable of carrying and transmitting the UUICS identification information according to the present invention. The tag assembly 120 includes a tag structure 124 comprising a base 126 and a face plate 128 which, according to one aspect of the present invention, are fused, molded, or otherwise joined together to encapsulate the transponder 122 therewithin. The base 126 includes a male connector member 130 which cooperates with an aperture 132 formed in a backing member 134 to couple the tag 124 to an animal (such as by piercing the male member 130 through an car of the animal) in a known fashion.

Referring to FIG. 7, the transponder 122 generally comprises a substrate or circuit board 136 having a memory and transmitter circuit 138 disposed thereon for storing and transmitting a unique universal identification character sequence (UUICS) for a particular animal in accordance with the present invention. The memory and transmitter circuit 138 includes a microchip 140 coupled to an antenna 142. The microchip 140 includes sufficient memory to store a unique universal identification character sequence (UUICS) according to the present invention. The memory and transmitter circuit 138 is preferably a magnetically-activated passive circuit such that, under the action of a magnetic field placed in close proximity, the antenna 142 will transmit the UUICS information to a receiver device. The transponder 122 may comprise any number of commercially available transponders. By way of example only, the transponder 122 may comprise an "electronic inlet" transponder device available from Polymer Flip Chip, Inc. of Billerica, Massachusetts. The transponder 122 may also transmit at any of a variety of suitable frequencies within the range from 125 KHz to 2.5 GHz. In one embodiment, the transponder 122 transmits at a frequency of 13.56 Megahertz.

TABLE 1

ISO 3166 Country Codes

| Country | A 2 | A 3 | Number |
|---|---|---|---|
| AFGHANISTAN | AF | AFG | 004 |
| ALBANIA | AL | ALB | 008 |
| ALGERIA | DZ | DZA | 012 |
| AMERICAN SAMOA | AS | ASM | 016 |
| ANDORRA | AD | AND | 020 |
| ANGOLA | AO | AGO | 024 |
| ANGUILLA | AI | AIA | 660 |
| ANTARCTICA | AQ | ATA | 010 |
| ANTIGUA AND BARBUDA | AG | ATG | 028 |
| ARGENTINA | AR | ARG | 032 |
| ARMENIA | AM | ARM | 051 |
| ARUBA | AW | ABW | 533 |
| AUSTRALIA | AU | AUS | 036 |
| AUSTRIA | AT | AUT | 040 |
| AZERBAIJAN | AZ | AZE | 031 |
| BAHAMAS | BS | BHS | 044 |
| BAHRAIN | BH | BHR | 048 |
| BANGLADESH | BD | BGD | 050 |
| BARBADOS | BB | BRB | 052 |
| BELARUS | BY | BLR | 112 |
| BELGIUM | BE | BEL | 056 |
| BELIZE | BZ | BLZ | 084 |
| BENIN | BJ | BEN | 204 |
| BERMUDA | BM | BMU | 060 |
| BHUTAN | BT | BTN | 064 |
| BOLIVIA | BO | BOL | 068 |
| BOSNIA AND HERZEGOWINA | BA | BIH | 070 |
| BOTSWANA | BW | BWA | 072 |
| BOUVET ISLAND | BV | BVT | 074 |
| BRAZIL | BR | BRA | 076 |
| BRITISH INDIAN OCEAN TERRITORY | IO | IOT | 086 |
| BRUNEI DARUSSALAM | BN | BRN | 096 |
| BULGARIA | BG | BGR | 100 |
| BURKINA FASO | BF | BFA | 854 |
| BURUNDI | BI | BDI | 108 |
| CAMBODIA | KH | KHM | 116 |
| CAMEROON | CM | CMR | 120 |
| CANADA | CA | CAN | 124 |
| CAPE VERDE | CV | CPV | 132 |
| CAYMAN ISLANDS | KY | CYM | 136 |
| CENTRAL AFRICAN REPUBLIC | CF | CAF | 140 |
| CHAD | TD | TCD | 148 |
| CHILE | CL | CHL | 152 |
| CHINA | CN | CHN | 156 |
| CHRISTMAS ISLAND | CX | CXR | 162 |
| COCOS (KEELING) ISLANDS | CC | CCK | 166 |
| COLOMBIA | CO | COL | 170 |
| COMOROS | KM | COM | 174 |
| CONGO | CG | COG | 178 |
| CONGO, THE DEMOCRATIC REPUBLIC OF THE | CD | COD | 180 |
| COOK ISLANDS | CK | COK | 184 |
| COSTA RICA | CR | CRI | 188 |
| COTE D'IVOIRE | CI | CIV | 384 |
| CROATIA (local name: Hrvatska) | HR | HRV | 191 |
| CUBA | CU | CUB | 192 |
| CYPRUS | CY | CYP | 196 |
| CZECH REPUBLIC | CZ | CZE | 203 |
| DENMARK | DK | DNK | 208 |
| DJIBOUTI | DJ | DJI | 262 |
| DOMINICA | DM | DMA | 212 |
| DOMINICAN REPUBLIC | DO | DOM | 214 |
| EAST TIMOR | TP | TMP | 626 |
| ECUADOR | EC | ECU | 218 |
| EGYPT | EG | EGY | 818 |
| EL SALVADOR | SV | SLV | 222 |
| EQUATORIAL GUINEA | GQ | GNQ | 226 |
| ERITREA | ER | ERI | 232 |
| ESTONIA | EE | EST | 233 |
| ETHIOPIA | ET | ETH | 231 |
| FALKLAND ISLANDS (MALVINAS) | FK | FLK | 238 |
| FAROE ISLANDS | FO | FRO | 234 |
| FIJI | FJ | FJI | 242 |
| FINLAND | FI | FIN | 246 |
| FRANCE | FR | FRA | 250 |
| FRANCE, METROPOLITAN | FX | FXX | 249 |
| FRENCH GUIANA | GF | GUF | 254 |
| FRENCH POLYNESIA | PF | PYF | 258 |
| FRENCH SOUTHERN TERRITORIES | TF | ATF | 260 |
| GABON | GA | GAB | 266 |
| GAMBIA | GM | GMB | 270 |
| GEORGIA | GE | GEO | 268 |
| GERMANY | DE | DEU | 276 |
| GHANA | GH | GHA | 288 |
| GIBRALTAR | GI | GIB | 292 |
| GREECE | GR | GRC | 300 |
| GREENLAND | GL | GRL | 304 |
| GRENADA | GD | GRD | 308 |
| GUADELOUPE | GP | GLP | 312 |
| GUAM | GU | GUM | 316 |
| GUATEMALA | GT | GTM | 320 |
| GUINEA | GN | GIN | 324 |
| GUINEA-BISSAU | GW | GNB | 624 |
| GUYANA | GY | GUY | 328 |
| HAITI | HT | HTI | 332 |
| HEARD AND MC DONALD ISLANDS | HM | HMD | 334 |
| HOLY SEE (VATICAN CITY STATE) | VA | VAT | 336 |
| HONDURAS | HN | HND | 340 |
| HONG KONG | HK | HKG | 344 |
| HUNGARY | HU | HUN | 348 |
| ICELAND | IS | ISL | 352 |
| INDIA | IN | IND | 356 |
| INDONESIA | ID | IDN | 360 |
| IRAN (ISLAMIC REPUBLIC OF) | IR | IRN | 364 |
| IRAQ | IQ | IRQ | 368 |
| IRELAND | IE | IRL | 372 |
| ISRAEL | IL | ISR | 376 |
| ITALY | IT | ITA | 380 |
| JAMAICA | JM | JAM | 388 |
| JAPAN | JP | JPN | 392 |
| JORDAN | JO | JOR | 400 |
| KAZAKHSTAN | KZ | KAZ | 398 |
| KENYA | KE | KEN | 404 |
| KIRIBATI | KI | KIR | 296 |
| KOREA, DEMOCRATIC PEOPLE'S REPUBLIC OF | KP | PRK | 408 |
| KOREA, REPUBLIC OF | KR | KOR | 410 |
| KUWAIT | KW | KWT | 414 |
| KYRGYZSTAN | KG | KGZ | 417 |
| LAO PEOPLE'S DEMOCRATIC REPUBLIC | LA | LAO | 418 |
| LATVIA | LV | LVA | 428 |
| LEBANON | LB | LBN | 422 |
| LESOTHO | LS | LSO | 426 |
| LIBERIA | LR | LBR | 430 |
| LIBYAN ARAB JAMAHIRIYA | LY | LBY | 434 |
| LIECHTENSTEIN | LI | LIE | 438 |
| LITHUANIA | LT | LTU | 440 |
| LUXEMBOURG | LU | LUX | 442 |
| MACAU | MO | MAC | 446 |
| MACEDONIA, THE FORMER YUGOSLAV REPUBLIC OF | MK | MKD | 807 |
| MADAGASCAR | MG | MDG | 450 |
| MALAWI | MW | MWI | 454 |
| MALAYSIA | MY | MYS | 458 |
| MALDIVES | MV | MDV | 462 |
| MALI | ML | MLI | 466 |
| MALTA | MT | MLT | 470 |
| MARSHALL ISLANDS | MH | MHL | 584 |
| MARTINIQUE | MQ | MTQ | 474 |
| MAURITANIA | MR | MRT | 478 |
| MAURITIUS | MU | MUS | 480 |
| MAYOTTE | YT | MYT | 175 |

TABLE 1-continued

ISO 3166 Country Codes

| Country | A 2 | A 3 | Number |
|---|---|---|---|
| MEXICO | MX | MEX | 484 |
| MICRONESIA, FEDERATED STATES OF | FM | FSM | 583 |
| MOLDOVA, REPUBLIC OF | MD | MDA | 498 |
| MONACO | MC | MCO | 492 |
| MONGOLIA | MN | MNG | 496 |
| MONTSERRAT | MS | MSR | 500 |
| MOROCCO | MA | MAR | 504 |
| MOZAMBIQUE | MZ | MOZ | 508 |
| MYANMAR | MM | MMR | 104 |
| NAMIBIA | NA | NAM | 516 |
| NAURU | NR | NRU | 520 |
| NEPAL | NP | NPL | 524 |
| NETHERLANDS | NL | NLD | 528 |
| NETHERLANDS ANTILLES | AN | ANT | 530 |
| NEW CALEDONIA | NC | NCL | 540 |
| NEW ZEALAND | NZ | NZL | 554 |
| NICARAGUA | NI | NIC | 558 |
| NIGER | NE | NER | 562 |
| NIGERIA | NG | NGA | 566 |
| NIUE | NU | NIU | 570 |
| NORFOLK ISLAND | NF | NFK | 574 |
| NORTHERN MARIANA ISLANDS | MP | MNP | 580 |
| NORWAY | NO | NOR | 578 |
| OMAN | OM | OMN | 512 |
| PAKISTAN | PK | PAK | 586 |
| PALAU | PW | PLW | 585 |
| PALESTINIAN TERRITORY, OCCUPIED | PS | PSE | 275 |
| PANAMA | PA | PAN | 591 |
| PAPUA NEW GUINEA | PG | PNG | 598 |
| PARAGUAY | PY | PRY | 600 |
| PERU | PE | PER | 604 |
| PHILIPPINES | PH | PHL | 608 |
| PITCAIRN | PN | PCN | 612 |
| POLAND | PL | POL | 616 |
| PORTUGAL | PT | PRT | 620 |
| PUERTO RICO | PR | PRI | 630 |
| QATAR | QA | QAT | 634 |
| REUNION | RE | REU | 638 |
| ROMANIA | RO | ROM | 642 |
| RUSSIAN FEDERATION | RU | RUS | 643 |
| RWANDA | RW | RWA | 646 |
| SAINT KITTS AND NEVIS | KN | KNA | 659 |
| SAINT LUCIA | LC | LCA | 662 |
| SAINT VINCENT AND THE GRENADINES | VC | VCT | 670 |
| SAMOA | WS | WSM | 882 |
| SAN MARINO | SM | SMR | 674 |
| SAO TOME AND PRINCIPE | ST | STP | 678 |
| SAUDI ARABIA | SA | SAU | 682 |
| SENEGAL | SN | SEN | 686 |
| SEYCHELLES | SC | SYC | 690 |
| SIERRA LEONE | SL | SLE | 694 |
| SINGAPORE | SG | SGP | 702 |
| SLOVAKIA (Slovak Republic) | SK | SVK | 703 |
| SLOVENIA | SI | SVN | 705 |
| SOLOMON ISLANDS | SB | SLB | 090 |
| SOMALIA | SO | SOM | 706 |
| SOUTH AFRICA | ZA | ZAF | 710 |
| SOUTH GEORGIA AND THE SOUTH SANDWICH ISLANDS | GS | SGS | 239 |
| SPAIN | ES | ESP | 724 |
| SRI LANKA | LK | LKA | 144 |
| ST. HELENA | SH | SHN | 654 |
| ST. PIERRE AND MIQUELON | PM | SPM | 666 |
| SUDAN | SD | SDN | 736 |
| SURINAME | SR | SUR | 740 |
| SVALBARD AND JAN MAYEN ISLANDS | SJ | SJM | 744 |
| SWAZILAND | SZ | SWZ | 748 |
| SWEDEN | SE | SWE | 752 |
| SWITZERLAND | CH | CHE | 756 |
| SYRIAN ARAB REPUBLIC | SY | SYR | 760 |
| TAIWAN, PROVINCE OF CHINA | TW | TWN | 158 |
| TAJIKISTAN | TJ | TJK | 762 |
| TANZANIA, UNITED REPUBLIC OF | TZ | TZA | 834 |
| THAILAND | TH | THA | 764 |
| TOGO | TG | TGO | 768 |
| TOKELAU | TK | TKL | 772 |
| TONGA | TO | TON | 776 |
| TRINIDAD AND TOBAGO | TT | TTO | 780 |
| TUNISIA | TN | TUN | 788 |
| TURKEY | TR | TUR | 792 |
| TURKMENISTAN | TM | TKM | 795 |
| TURKS AND CAICOS ISLANDS | TC | TCA | 796 |
| TUVALU | TV | TUV | 798 |
| UGANDA | UG | UGA | 800 |
| UKRAINE | UA | UKR | 804 |
| UNITED ARAB EMIRATES | AE | ARE | 784 |
| UNITED KINGDOM | GB | GBR | 826 |
| UNITED STATES | US | USA | 840 |
| UNITED STATES MINOR OUTLYING ISLANDS | UM | UMI | 581 |
| URUGUAY | UY | URY | 858 |
| UZBEKISTAN | UZ | UZB | 860 |
| VANUATU | VU | VUT | 548 |
| VENEZUELA | VE | VEN | 862 |
| VIETNAM | VN | VNM | 704 |
| VIRGIN ISLANDS (BRITISH) | VG | VGB | 092 |
| VIRGIN ISLANDS (U.S.) | VI | VIR | 850 |
| WALLIS AND FUTUNA ISLANDS | WF | WLF | 876 |
| WESTERN SAHARA | EH | ESH | 732 |
| YEMEN | YE | YEM | 887 |
| YUGOSLAVIA | YU | YUG | 891 |
| ZAMBIA | ZM | ZMB | 894 |
| Zimbabwe | ZW | ZWE | 716 |

TABLE 2

| State Level FIPS Code | State Name |
|---|---|
| 01 | ALABAMA |
| 02 | ALASKA |
| 04 | ARIZONA |
| 05 | ARKANSAS |
| 06 | CALIFORNIA |
| 08 | COLORADO |
| 09 | CONNECTICUT |
| 10 | DELAWARE |
| 11 | DISTRICT OF COLUMBIA |
| 12 | FLORIDA |
| 13 | GEORGIA |
| 15 | HAWAII |
| 16 | IDAHO |
| 17 | ILLINOIS |
| 18 | INDIANA |
| 19 | IOWA |
| 20 | KANSAS |
| 21 | KENTUCKY |
| 22 | LOUISIANA |
| 23 | MAINE |
| 24 | MARYLAND |
| 25 | MASSACHUSETTS |
| 26 | MICHIGAN |
| 27 | MINNESOTA |
| 28 | MISSISSIPPI |
| 29 | MISSOURI |
| 30 | MONTANA |
| 31 | NEBRASKA |
| 32 | NEVADA |
| 33 | NEW HAMPSHIRE |
| 34 | NEW JERSEY |
| 35 | NEW MEXICO |
| 36 | NEW YORK |
| 37 | NORTH CAROLINA |
| 38 | NORTH DAKOTA |
| 39 | OHIO |
| 40 | OKLAHOMA |
| 41 | OREGON |

TABLE 2-continued

| State Level FIPS Code | State Name |
|---|---|
| 42 | PENNSYLVANIA |
| 44 | RHODE ISLAND |
| 45 | SOUTH CAROLINA |
| 46 | SOUTH DAKOTA |
| 47 | TENNESSEE |
| 48 | TEXAS |
| 49 | UTAH |
| 50 | VERMONT |
| 51 | VIRGINIA |
| 53 | WASHINGTON |
| 54 | WEST VIRGINIA |
| 55 | WISCONSIN |
| 56 | WYOMING |

TABLE 3

| County- Level FIPS Code | County Name, State |
|---|---|
| ALASKA | |
| 013 | Aleutians East, AK |
| 016 | Aleutians West, AK |
| 020 | Anchorage, AK |
| 050 | Bethel, AK |
| 060 | Bristol Bay, AK |
| 068 | Denali, AK |
| 070 | Dillingham, AK |
| 090 | Fairbanks North Star, AK |
| 100 | Haines, AK |
| 110 | Juneau, AK |
| 122 | Kenai Peninsula, AK |
| 130 | Ketchikan Gateway, AK |
| 150 | Kodiak Island, AK |
| 164 | Lake and Peninsula, AK |
| 170 | Matanuska-Susitna, AK |
| 180 | Nome, AK |
| 185 | North Slope, AK |
| 188 | Northwest Arctic, AK |
| 201 | Prince of Wales-Outer Ketchikan, AK |
| 220 | Sitka, AK |
| 232 | Skagway-Hoonah-Angoon, AK |
| 240 | Southeast Fairbanks, AK |
| 261 | Valdez-Cordova, AK |
| 270 | Wade Hampton, AK |
| 280 | Wrangell-Petersburg, AK |
| 282 | Yakutat, AK |
| 290 | Yukon-Koyukuk, AK |
| ALABAMA | |
| 001 | Autauga, AL |
| 003 | Baldwin, AL |
| 005 | Barbour, AL |
| 007 | Bibb, AL |
| 009 | Blount, AL |
| 011 | Bullock, AL |
| 013 | Butler, AL |
| 015 | Calhoun, AL |
| 017 | Chambers, AL |
| 019 | Cherokee, AL |
| 021 | Chilton, AL |
| 023 | Choctaw, AL |
| 025 | Clarke, AL |
| 027 | Clay, AL |
| 029 | Cleburne, AL |
| 031 | Coffee, AL |
| 033 | Colbert, AL |
| 035 | Conecuh, AL |
| 037 | Coosa, AL |
| 039 | Covington, AL |
| 041 | Crenshaw, AL |
| 043 | Cullman, AL |
| 045 | Dale, AL |
| 047 | Dallas, AL |
| 049 | De Kalb, AL |
| 051 | Elmore, AL |
| 053 | Escambia, AL |
| 055 | Etowah, AL |
| 057 | Fayette, AL |
| 059 | Franklin, AL |
| 061 | Geneva, AL |
| 063 | Greene, AL |
| 065 | Hale, AL |
| 067 | Henry, AL |
| 069 | Houston, AL |
| 071 | Jackson, AL |
| 073 | Jefferson, AL |
| 075 | Lamar, AL |
| 077 | Lauderdale, AL |
| 079 | Lawrence, AL |
| 081 | Lee, AL |
| 083 | Limestone, AL |
| 085 | Lowndes, AL |
| 087 | Macon, AL |
| 089 | Madison, AL |
| 091 | Marengo, AL |
| 093 | Marion, AL |
| 095 | Marshall, AL |
| 097 | Mobile, AL |
| 099 | Monroe, AL |
| 101 | Montgomery, AL |
| 103 | Morgan, AL |
| 105 | Perry, AL |
| 107 | Pickens, AL |
| 109 | Pike, AL |
| 111 | Randolph, AL |
| 113 | Russell, AL |
| 115 | St. Clair, AL |
| 117 | Shelby, AL |
| 119 | Sumter, AL |
| 121 | Talladega, AL |
| 123 | Tallapoosa, AL |
| 125 | Tuscaloosa, AL |
| 127 | Walker, AL |
| 129 | Washington, AL |
| 131 | Wilcox, AL |
| 133 | Winston, AL |
| ARIZONA | |
| 001 | Apache, AZ |
| 003 | Cochise, AZ |
| 005 | Coconino, AZ |
| 007 | Gila, AZ |
| 009 | Graham, AZ |
| 011 | Greenlee, AZ |
| 012 | La Paz, AZ |
| 013 | Maricopa, AZ |
| 015 | Mohave, AZ |
| 017 | Navajo, AZ |
| 019 | Pima, AZ |
| 021 | Pinal, AZ |
| 023 | Santa Cruz, AZ |
| 025 | Yavapai, AZ |
| 027 | Yuma, AZ |
| ARKANSAS | |
| 001 | Arkansas, AR |
| 003 | Ashley, AR |
| 005 | Baxter, AR |
| 007 | Benton, AR |
| 009 | Boone, AR |
| 011 | Bradley, AR |
| 013 | Calhoun, AR |
| 015 | Carroll, AR |
| 017 | Chicot, AR |
| 019 | Clark, AR |
| 021 | Clay, AR |
| 023 | Cleburne, AR |
| 025 | Cleveland, AR |

TABLE 3-continued

| County-Level FIPS Code | County Name, State |
|---|---|
| 027 | Columbia, AR |
| 029 | Conway, AR |
| 031 | Craighead, AR |
| 033 | Crawford, AR |
| 035 | Crittenden, AR |
| 037 | Cross, AR |
| 039 | Dallas, AR |
| 041 | Desha, AR |
| 043 | Drew, AR |
| 045 | Faulkner, AR |
| 047 | Franklin, AR |
| 049 | Fulton, AR |
| 051 | Garland, AR |
| 053 | Grant, AR |
| 055 | Greene, AR |
| 057 | Hempstead, AR |
| 059 | Hot Spring, AR |
| 061 | Howard, AR |
| 063 | Independence, AR |
| 065 | Izard, AR |
| 067 | Jackson, AR |
| 069 | Jefferson, AR |
| 071 | Johnson, AR |
| 073 | Lafayette, AR |
| 075 | Lawrence, AR |
| 077 | Lee, AR |
| 079 | Lincoln, AR |
| 081 | Little River, AR |
| 083 | Logan, AR |
| 085 | Lonoke, AR |
| 087 | Madison, AR |
| 089 | Marion, AR |
| 091 | Miller, AR |
| 093 | Mississippi, AR |
| 095 | Monroe, AR |
| 097 | Montgomery, AR |
| 099 | Nevada, AR |
| 101 | Newton, AR |
| 103 | Ouachita, AR |
| 105 | Perry, AR |
| 107 | Phillips, AR |
| 109 | Pike, AR |
| 111 | Poinsett, AR |
| 113 | Polk, AR |
| 115 | Pope, AR |
| 117 | Prairie, AR |
| 119 | Pulaski, AR |
| 121 | Randolph, AR |
| 123 | St. Francis, AR |
| 125 | Saline, AR |
| 127 | Scott, AR |
| 129 | Searcy, AR |
| 131 | Sebastian, AR |
| 133 | Sevier, AR |
| 135 | Sharp, AR |
| 137 | Stone, AR |
| 139 | Union, AR |
| 141 | Van Buren, AR |
| 143 | Washington, AR |
| 145 | White, AR |
| 147 | Woodruff, AR |
| 149 | Yell, AR |
| CALIFORNIA | |
| 001 | Alameda, CA |
| 003 | Alpine, CA |
| 005 | Amador, CA |
| 007 | Butte, CA |
| 009 | Calaveras, CA |
| 011 | Colusa, CA |
| 013 | Contra Costa, CA |
| 015 | Del Norte, CA |
| 017 | El Dorado, CA |
| 019 | Fresno, CA |
| 021 | Glenn, CA |
| 023 | Humboldt, CA |
| 025 | Imperial, CA |
| 027 | Inyo, CA |
| 029 | Kern, CA |
| 031 | Kings, CA |
| 033 | Lake, CA |
| 035 | Lassen, CA |
| 037 | Los Angeles, CA |
| 039 | Madera, CA |
| 041 | Marin, CA |
| 043 | Mariposa, CA |
| 045 | Mendocino, CA |
| 047 | Merced, CA |
| 049 | Modoc, CA |
| 051 | Mono, CA |
| 053 | Monterey, CA |
| 055 | Napa, CA |
| 057 | Nevada, CA |
| 059 | Orange, CA |
| 061 | Placer, CA |
| 063 | Plumas, CA |
| 065 | Riverside, CA |
| 067 | Sacramento, CA |
| 069 | San Benito, CA |
| 071 | San Bernardino, CA |
| 073 | San Diego, CA |
| 075 | San Francisco, CA |
| 077 | San Joaquin, CA |
| 079 | San Luis Obispo, CA |
| 081 | San Mateo, CA |
| 083 | Santa Barbara, CA |
| 085 | Santa Clara, CA |
| 087 | Santa Cruz, CA |
| 089 | Shasta, CA |
| 091 | Sierra, CA |
| 093 | Siskiyou, CA |
| 095 | Solano, CA |
| 097 | Sonoma, CA |
| 099 | Stanislaus, CA |
| 101 | Sutter, CA |
| 103 | Tehama, CA |
| 105 | Trinity, CA |
| 107 | Tulare, CA |
| 109 | Tuolumne, CA |
| 111 | Ventura, CA |
| 113 | Yolo, CA |
| 115 | Yuba, CA |
| COLORADO | |
| 001 | Adams, CO |
| 003 | Alamosa, CO |
| 005 | Arapahoe, CO |
| 007 | Archuleta, CO |
| 009 | Baca, CO |
| 011 | Bent, CO |
| 013 | Boulder, CO |
| 015 | Chaffee, CO |
| 017 | Cheyenne, CO |
| 019 | Clear Creek, CO |
| 021 | Conejos, CO |
| 023 | Costilla, CO |
| 025 | Crowley, CO |
| 027 | Custer, CO |
| 029 | Delta, CO |
| 031 | Denver, CO |
| 033 | Dolores, CO |
| 035 | Douglas, CO |
| 037 | Eagle, CO |
| 039 | Elbert, CO |
| 041 | El Paso, CO |
| 043 | Fremont, CO |
| 045 | Garfield, CO |
| 047 | Gilpin, CO |
| 049 | Grand, CO |
| 051 | Gunnison, CO |
| 053 | Hinsdale, CO |
| 055 | Huerfano, CO |

TABLE 3-continued

| County-Level FIPS Code | County Name, State |
|---|---|
| 057 | Jackson, CO |
| 059 | Jefferson, CO |
| 061 | Kiowa, CO |
| 063 | Kit Carson, CO |
| 065 | Lake, CO |
| 067 | La Plata, CO |
| 069 | Larimer, CO |
| 071 | Las Animas, CO |
| 073 | Lincoln, CO |
| 075 | Logan, CO |
| 077 | Mesa, CO |
| 079 | Mineral, CO |
| 081 | Moffat, CO |
| 083 | Montezuma, CO |
| 085 | Montrose, CO |
| 087 | Morgan, CO |
| 089 | Otero, CO |
| 091 | Ouray, CO |
| 093 | Park, CO |
| 095 | Phillips, CO |
| 097 | Pitkin, CO |
| 099 | Prowers, CO |
| 101 | Pueblo, CO |
| 103 | Rio Blanco, CO |
| 105 | Rio Grande, CO |
| 107 | Routt, CO |
| 109 | Saguache, CO |
| 111 | San Juan, CO |
| 113 | San Miguel, CO |
| 115 | Sedgwick, CO |
| 117 | Summit, CO |
| 119 | Teller, CO |
| 121 | Washington, CO |
| 123 | Weld, CO |
| 125 | Yuma, CO |
| CONNECTICUT | |
| 001 | Fairfield, CT |
| 003 | Hartford, CT |
| 005 | Litchfield, CT |
| 007 | Middlesex, CT |
| 009 | New Haven, CT |
| 011 | New London, CT |
| 013 | Tolland, CT |
| 015 | Windham, CT |
| DISTRICT OF COLUMBIA | |
| 001 | District of Columbia |
| DELAWARE | |
| 001 | Kent, DE |
| 003 | New Castle, DE |
| 005 | Sussex, DE |
| FLORIDA | |
| 001 | Alachua, FL |
| 003 | Baker, FL |
| 005 | Bay, FL |
| 007 | Bradford, FL |
| 009 | Brevard, FL |
| 011 | Broward, FL |
| 013 | Calhoun, FL |
| 015 | Charlotte, FL |
| 017 | Citrus, FL |
| 019 | Clay, FL |
| 021 | Collier, FL |
| 023 | Columbia, FL |
| 025 | Dade, FL |
| 027 | De Soto, FL |
| 029 | Dixie, FL |
| 031 | Duval, FL |
| 033 | Escambia, FL |
| 035 | Flagler, FL |
| 037 | Franklin, FL |
| 039 | Gadsden, FL |
| 041 | Gilchrist, FL |

TABLE 3-continued

| County-Level FIPS Code | County Name, State |
|---|---|
| 043 | Glades, FL |
| 045 | Gulf, FL |
| 047 | Hamilton, FL |
| 049 | Hardee, FL |
| 051 | Hendry, FL |
| 053 | Hernando, FL |
| 055 | Highlands, FL |
| 057 | Hillsborough, FL |
| 059 | Holmes, FL |
| 061 | Indian River, FL |
| 063 | Jackson, FL |
| 065 | Jefferson, FL |
| 067 | Lafayette, FL |
| 069 | Lake, FL |
| 071 | Lee, FL |
| 073 | Leon, FL |
| 075 | Levy, FL |
| 077 | Liberty, FL |
| 079 | Madison, FL |
| 081 | Manatee, FL |
| 083 | Marion, FL |
| 085 | Martin, FL |
| 087 | Monroe, FL |
| 089 | Nassau, FL |
| 091 | Okaloosa, FL |
| 093 | Okeechobee, FL |
| 095 | Orange, FL |
| 097 | Osceola, FL |
| 099 | Palm Beach, FL |
| 101 | Pasco, FL |
| 103 | Pinellas, FL |
| 105 | Polk, FL |
| 107 | Putnam, FL |
| 109 | St. Johns, FL |
| 111 | St. Lucie, FL |
| 113 | Santa Rosa, FL |
| 115 | Sarasota, FL |
| 117 | Seminole, FL |
| 119 | Sumter, FL |
| 121 | Suwannee, FL |
| 123 | Taylor, FL |
| 125 | Union, FL |
| 127 | Volusia, FL |
| 129 | Wakulla, FL |
| 131 | Walton, FL |
| 133 | Washington, FL |
| GEORGIA | |
| 001 | Appling, GA |
| 003 | Atkinson, GA |
| 005 | Bacon, GA |
| 007 | Baker, GA |
| 009 | Baldwin, GA |
| 011 | Banks, GA |
| 013 | Barrow, GA |
| 015 | Bartow, GA |
| 017 | Ben Hill, GA |
| 019 | Berrien, GA |
| 021 | Bibb, GA |
| 023 | Bleckley, GA |
| 025 | Brantley, GA |
| 027 | Brooks, GA |
| 029 | Bryan, GA |
| 031 | Bulloch, GA |
| 033 | Burke, GA |
| 035 | Butts, GA |
| 037 | Calhoun, GA |
| 039 | Camden, GA |
| 043 | Candler, GA |
| 045 | Carroll, GA |
| 047 | Catoosa, GA |
| 049 | Charlton, GA |
| 051 | Chatham, GA |
| 053 | Chattahoochee, GA |
| 055 | Chattooga, GA |
| 057 | Cherokee, GA |

TABLE 3-continued

| County-Level FIPS Code | County Name, State |
|---|---|
| 059 | Clarke, GA |
| 061 | Clay, GA |
| 063 | Clayton, GA |
| 065 | Clinch, GA |
| 067 | Cobb, GA |
| 069 | Coffee, GA |
| 071 | Colquitt, GA |
| 073 | Columbia, GA |
| 075 | Cook, GA |
| 077 | Coweta, GA |
| 079 | Crawford, GA |
| 081 | Crisp, GA |
| 083 | Dade, GA |
| 085 | Dawson, GA |
| 087 | Decatur, GA |
| 089 | De Kalb, GA |
| 091 | Dodge, GA |
| 093 | Dooly, GA |
| 095 | Dougherty, GA |
| 097 | Douglas, GA |
| 099 | Early, GA |
| 101 | Echols, GA |
| 103 | Effingham, GA |
| 105 | Elbert, GA |
| 107 | Emanuel, GA |
| 109 | Evans, GA |
| 111 | Fannin, GA |
| 113 | Fayette, GA |
| 115 | Floyd, GA |
| 117 | Forsyth, GA |
| 119 | Franklin, GA |
| 121 | Fulton, GA |
| 123 | Gilmer, GA |
| 125 | Glascock, GA |
| 127 | Glynn, GA |
| 129 | Gordon, GA |
| 131 | Grady, GA |
| 133 | Greene, GA |
| 135 | Gwinnett, GA |
| 137 | Habersham, GA |
| 139 | Hall, GA |
| 141 | Hancock, GA |
| 143 | Haralson, GA |
| 145 | Harris, GA |
| 147 | Hart, GA |
| 149 | Heard, GA |
| 151 | Henry, GA |
| 153 | Houston, GA |
| 155 | Irwin, GA |
| 157 | Jackson, GA |
| 159 | Jasper, GA |
| 161 | Jeff Davis, GA |
| 163 | Jefferson, GA |
| 165 | Jenkins, GA |
| 167 | Johnson, GA |
| 169 | Jones, GA |
| 171 | Lamar, GA |
| 173 | Lanier, GA |
| 175 | Laurens, GA |
| 177 | Lee, GA |
| 179 | Liberty, GA |
| 181 | Lincoln, GA |
| 183 | Long, GA |
| 185 | Lowndes, GA |
| 187 | Lumpkin, GA |
| 189 | McDuffie, GA |
| 191 | McIntosh, GA |
| 193 | Macon, GA |
| 195 | Madison, GA |
| 197 | Marion, GA |
| 199 | Meriwether, GA |
| 201 | Miller, GA |
| 205 | Mitchell, GA |
| 207 | Monroe, GA |
| 209 | Montgomery, GA |
| 211 | Morgan, GA |
| 213 | Murray, GA |
| 215 | Muscogee, GA |
| 217 | Newton, GA |
| 219 | Oconee, GA |
| 221 | Oglethorpe, GA |
| 223 | Paulding, GA |
| 225 | Peach, GA |
| 227 | Pickens, GA |
| 229 | Pierce, GA |
| 231 | Pike, GA |
| 233 | Polk, GA |
| 235 | Pulaski, GA |
| 237 | Putnam, GA |
| 239 | Quitman, GA |
| 241 | Rabun, GA |
| 243 | Randolph, GA |
| 245 | Richmond, GA |
| 247 | Rockdale, GA |
| 249 | Schley, GA |
| 251 | Screven, GA |
| 253 | Seminole, GA |
| 255 | Spalding, GA |
| 257 | Stephens, GA |
| 259 | Stewart, GA |
| 261 | Sumter, GA |
| 263 | Talbot, GA |
| 265 | Taliaferro, GA |
| 267 | Tattnall, GA |
| 269 | Taylor, GA |
| 271 | Telfair, GA |
| 273 | Terrell, GA |
| 275 | Thomas, GA |
| 277 | Tift, GA |
| 279 | Toombs, GA |
| 281 | Towns, GA |
| 283 | Treutlen, GA |
| 285 | Troup, GA |
| 287 | Turner, GA |
| 289 | Twiggs, GA |
| 291 | Union, GA |
| 293 | Upson, GA |
| 295 | Walker, GA |
| 297 | Walton, GA |
| 299 | Ware, GA |
| 301 | Warren, GA |
| 303 | Washington, GA |
| 305 | Wayne, GA |
| 307 | Webster, GA |
| 309 | Wheeler, GA |
| 311 | White, GA |
| 313 | Whitfield, GA |
| 315 | Wilcox, GA |
| 317 | Wilkes, GA |
| 319 | Wilkinson, GA |
| 321 | Worth, GA |
| HAWAII | |
| 001 | Hawaii, HI |
| 003 | Honolulu, HI |
| 005 | Kalawao, HI |
| 007 | Kauai, HI |
| 009 | Maui, HI |
| IOWA | |
| 001 | Adair, IA |
| 003 | Adams, IA |
| 005 | Allamakee, IA |
| 007 | Appanoose, IA |
| 009 | Audubon, IA |
| 011 | Benton, IA |
| 013 | Black Hawk, IA |
| 015 | Boone, IA |
| 017 | Bremer, IA |
| 019 | Buchanan, IA |
| 021 | Buena Vista, IA |
| 023 | Butler, IA |

TABLE 3-continued

| County-Level FIPS Code | County Name, State |
|---|---|
| 025 | Calhoun, IA |
| 027 | Carroll, IA |
| 029 | Cass, IA |
| 031 | Cedar, IA |
| 033 | Cerro Gordo, IA |
| 035 | Cherokee, IA |
| 037 | Chickasaw, IA |
| 039 | Clarke, IA |
| 041 | Clay, IA |
| 043 | Clayton, IA |
| 045 | Clinton, IA |
| 047 | Crawford, IA |
| 049 | Dallas, IA |
| 051 | Davis, IA |
| 053 | Decatur, IA |
| 055 | Delaware, IA |
| 057 | Des Moines, IA |
| 059 | Dickinson, IA |
| 061 | Dubuque, IA |
| 063 | Emmet, IA |
| 065 | Fayette, IA |
| 067 | Floyd, IA |
| 069 | Franklin, IA |
| 071 | Fremont, IA |
| 073 | Greene, IA |
| 075 | Grundy, IA |
| 077 | Guthrie, IA |
| 079 | Hamilton, IA |
| 081 | Hancock, IA |
| 083 | Hardin, IA |
| 085 | Harrison, IA |
| 087 | Henry, IA |
| 089 | Howard, IA |
| 091 | Humboldt, IA |
| 093 | Ida, IA |
| 095 | Iowa, IA |
| 097 | Jackson, IA |
| 099 | Jasper, IA |
| 101 | Jefferson, IA |
| 103 | Johnson, IA |
| 105 | Jones, IA |
| 107 | Keokuk, IA |
| 109 | Kossuth, IA |
| 111 | Lee, IA |
| 113 | Linn, IA |
| 115 | Louisa, IA |
| 117 | Lucas, IA |
| 119 | Lyon, IA |
| 121 | Madison, IA |
| 123 | Mahaska, IA |
| 125 | Marion, IA |
| 127 | Marshall, IA |
| 129 | Mills, IA |
| 131 | Mitchell, IA |
| 133 | Monona, IA |
| 135 | Monroe, IA |
| 137 | Montgomery, IA |
| 139 | Muscatine, IA |
| 141 | O'Brien, IA |
| 143 | Osceola, IA |
| 145 | Page, IA |
| 147 | Palo Alto, IA |
| 149 | Plymouth, IA |
| 151 | Pocahontas, IA |
| 153 | Polk, IA |
| 155 | Pottawattamie, IA |
| 157 | Poweshiek, IA |
| 159 | Ringgold, IA |
| 161 | Sac, IA |
| 163 | Scott, IA |
| 165 | Shelby, IA |
| 167 | Sioux, IA |
| 169 | Story, IA |
| 171 | Tama, IA |
| 173 | Taylor, IA |
| 175 | Union, IA |
| 177 | Van Buren, IA |
| 179 | Wapello, IA |
| 181 | Warren, IA |
| 183 | Washington, IA |
| 185 | Wayne, IA |
| 187 | Webster, IA |
| 189 | Winnebago, IA |
| 191 | Winneshiek, IA |
| 193 | Woodbury, IA |
| 195 | Worth, IA |
| 197 | Wright, IA |

IDAHO

| County-Level FIPS Code | County Name, State |
|---|---|
| 001 | Ada, ID |
| 003 | Adams, ID |
| 005 | Bannock, ID |
| 007 | Bear Lake, ID |
| 009 | Benewah, ID |
| 011 | Bingham, ID |
| 013 | Blaine, ID |
| 015 | Boise, ID |
| 017 | Bonner, ID |
| 019 | Bonneville, ID |
| 021 | Boundary, ID |
| 023 | Butte, ID |
| 025 | Camas, ID |
| 027 | Canyon, ID |
| 029 | Caribou, ID |
| 031 | Cassia, ID |
| 033 | Clark, ID |
| 035 | Clearwater, ID |
| 037 | Custer, ID |
| 039 | Elmore, ID |
| 041 | Franklin, ID |
| 043 | Fremont, ID |
| 045 | Gem, ID |
| 047 | Gooding, ID |
| 049 | Idaho, ID |
| 051 | Jefferson, ID |
| 053 | Jerome, ID |
| 055 | Kootenai, ID |
| 057 | Latah, ID |
| 059 | Lemhi, ID |
| 061 | Lewis, ID |
| 063 | Lincoln, ID |
| 065 | Madison, ID |
| 067 | Minidoka, ID |
| 069 | Nez Perce, ID |
| 071 | Oneida, ID |
| 073 | Owyhee, ID |
| 075 | Payette, ID |
| 077 | Power, ID |
| 079 | Shoshone, ID |
| 081 | Teton, ID |
| 083 | Twin Falls, ID |
| 085 | Valley, ID |
| 087 | Washington, ID |

ILLINOIS

| County-Level FIPS Code | County Name, State |
|---|---|
| 001 | Adams, IL |
| 003 | Alexander, IL |
| 005 | Bond, IL |
| 007 | Boone, IL |
| 009 | Brown, IL |
| 011 | Bureau, IL |
| 013 | Calhoun, IL |
| 015 | Carroll, IL |
| 017 | Cass, IL |
| 019 | Champaign, IL |
| 021 | Christian, IL |
| 023 | Clark, IL |
| 025 | Clay, IL |
| 027 | Clinton, IL |
| 029 | Coles, IL |
| 031 | Cook, IL |
| 033 | Crawford, IL |

TABLE 3-continued

| County-Level FIPS Code | County Name, State |
|---|---|
| 035 | Cumberland, IL |
| 037 | DeKalb, IL |
| 039 | De Witt, IL |
| 041 | Douglas, IL |
| 043 | DuPage, IL |
| 045 | Edgar, IL |
| 047 | Edwards, IL |
| 049 | Effingham, IL |
| 051 | Fayette, IL |
| 053 | Ford, IL |
| 055 | Franklin, IL |
| 057 | Fulton, IL |
| 059 | Gallatin, IL |
| 061 | Greene, IL |
| 063 | Grundy, IL |
| 065 | Hamilton, IL |
| 067 | Hancock, IL |
| 069 | Hardin, IL |
| 071 | Henderson, IL |
| 073 | Henry, IL |
| 075 | Iroquois, IL |
| 077 | Jackson, IL |
| 079 | Jasper, IL |
| 081 | Jefferson, IL |
| 083 | Jersey, IL |
| 085 | Jo Daviess, IL |
| 087 | Johnson, IL |
| 089 | Kane, IL |
| 091 | Kankakee, IL |
| 093 | Kendall, IL |
| 095 | Knox, IL |
| 097 | Lake, IL |
| 099 | La Salle, IL |
| 101 | Lawrence, IL |
| 103 | Lee, IL |
| 105 | Livingston, IL |
| 107 | Logan, IL |
| 109 | McDonough, IL |
| 111 | McHenry, IL |
| 113 | McLean, IL |
| 115 | Macon, IL |
| 117 | Macoupin, IL |
| 119 | Madison, IL |
| 121 | Marion, IL |
| 123 | Marshall, IL |
| 125 | Mason, IL |
| 127 | Massac, IL |
| 129 | Menard, IL |
| 131 | Mercer, IL |
| 133 | Monroe, IL |
| 135 | Montgomery, IL |
| 137 | Morgan, IL |
| 139 | Moultrie, IL |
| 141 | Ogle, IL |
| 143 | Peoria, IL |
| 145 | Perry, IL |
| 147 | Piatt, IL |
| 149 | Pike, IL |
| 151 | Pope, IL |
| 153 | Pulaski, IL |
| 155 | Putnam, IL |
| 157 | Randolph, IL |
| 159 | Richland, IL |
| 161 | Rock Island, IL |
| 163 | St. Clair, IL |
| 165 | Saline, IL |
| 167 | Sangamon, IL |
| 169 | Schuyler, IL |
| 171 | Scott, IL |
| 173 | Shelby, IL |
| 175 | Stark, IL |
| 177 | Stephenson, IL |
| 179 | Tazewell, IL |
| 181 | Union, IL |
| 183 | Vermilion, IL |
| 185 | Wabash, IL |
| 187 | Warren, IL |
| 189 | Washington, IL |
| 191 | Wayne, IL |
| 193 | White, IL |
| 195 | Whiteside, IL |
| 197 | Will, IL |
| 199 | Williamson, IL |
| 201 | Winnebago, IL |
| 203 | Woodford, IL |
| INDIANA | |
| 001 | Adams, IN |
| 003 | Allen, IN |
| 005 | Bartholomew, IN |
| 007 | Benton, IN |
| 009 | Blackford, IN |
| 011 | Boone, IN |
| 013 | Brown, IN |
| 015 | Carroll, IN |
| 017 | Cass, IN |
| 019 | Clark, IN |
| 021 | Clay, IN |
| 023 | Clinton, IN |
| 025 | Crawford, IN |
| 027 | Daviess, IN |
| 029 | Dearborn, IN |
| 031 | Decatur, IN |
| 033 | De Kalb, IN |
| 035 | Delaware, IN |
| 037 | Dubois, IN |
| 039 | Elkhart, IN |
| 041 | Fayette, IN |
| 043 | Floyd, IN |
| 045 | Fountain, IN |
| 047 | Franklin, IN |
| 049 | Fulton, IN |
| 051 | Gibson, IN |
| 053 | Grant, IN |
| 055 | Greene, IN |
| 057 | Hamilton, IN |
| 059 | Hancock, IN |
| 061 | Harrison, IN |
| 063 | Hendricks, IN |
| 065 | Henry, IN |
| 067 | Howard, IN |
| 069 | Huntington, IN |
| 071 | Jackson, IN |
| 073 | Jasper, IN |
| 075 | Jay, IN |
| 077 | Jefferson, IN |
| 079 | Jennings, IN |
| 081 | Johnson, IN |
| 083 | Knox, IN |
| 085 | Kosciusko, IN |
| 087 | Lagrange, IN |
| 089 | Lake, IN |
| 091 | La Porte, IN |
| 093 | Lawrence, IN |
| 095 | Madison, IN |
| 097 | Marion, IN |
| 099 | Marshall, IN |
| 101 | Martin, IN |
| 103 | Miami, IN |
| 105 | Monroe, IN |
| 107 | Montgomery, IN |
| 109 | Morgan, IN |
| 111 | Newton, IN |
| 113 | Noble, IN |
| 115 | Ohio, IN |
| 117 | Orange, IN |
| 119 | Owen, IN |
| 121 | Parke, IN |
| 123 | Perry, IN |
| 125 | Pike, IN |
| 127 | Porter, IN |
| 129 | Posey, IN |

TABLE 3-continued

| County-Level FIPS Code | County Name, State |
|---|---|
| 131 | Pulaski, IN |
| 133 | Putnam, IN |
| 135 | Randolph, IN |
| 137 | Ripley, IN |
| 139 | Rush, IN |
| 141 | St. Joseph, IN |
| 143 | Scott, IN |
| 145 | Shelby, IN |
| 147 | Spencer, IN |
| 149 | Starke, IN |
| 151 | Steuben, IN |
| 153 | Sullivan, IN |
| 155 | Switzerland, IN |
| 157 | Tippecanoe, IN |
| 159 | Tipton, IN |
| 161 | Union, IN |
| 163 | Vanderburgh, IN |
| 165 | Vermillion, IN |
| 167 | Vigo, IN |
| 169 | Wabash, IN |
| 171 | Warren, IN |
| 173 | Warrick, IN |
| 175 | Washington, IN |
| 177 | Wayne, IN |
| 179 | Wells, IN |
| 181 | White, IN |
| 183 | Whitley, IN |
| KANSAS | |
| 001 | Allen, KS |
| 003 | Anderson, KS |
| 005 | Atchison, KS |
| 007 | Barber, KS |
| 009 | Barton, KS |
| 011 | Bourbon, KS |
| 013 | Brown, KS |
| 015 | Butler, KS |
| 017 | Chase, KS |
| 019 | Chautauqua, KS |
| 021 | Cherokee, KS |
| 023 | Cheyenne, KS |
| 025 | Clark, KS |
| 027 | Clay, KS |
| 029 | Cloud, KS |
| 031 | Coffey, KS |
| 033 | Comanche, KS |
| 035 | Cowley, KS |
| 037 | Crawford, KS |
| 039 | Decatur, KS |
| 041 | Dickinson, KS |
| 043 | Doniphan, KS |
| 045 | Douglas, KS |
| 047 | Edwards, KS |
| 049 | Elk, KS |
| 051 | Ellis, KS |
| 053 | Ellsworth, KS |
| 055 | Finney, KS |
| 057 | Ford, KS |
| 059 | Franklin, KS |
| 061 | Geary, KS |
| 063 | Gove, KS |
| 065 | Graham, KS |
| 067 | Grant, KS |
| 069 | Gray, KS |
| 071 | Greeley, KS |
| 073 | Greenwood, KS |
| 075 | Hamilton, KS |
| 077 | Harper, KS |
| 079 | Harvey, KS |
| 081 | Haskell, KS |
| 083 | Hodgeman, KS |
| 085 | Jackson, KS |
| 087 | Jefferson, KS |
| 089 | Jewell, KS |
| 091 | Johnson, KS |
| 093 | Kearny, KS |
| 095 | Kingman, KS |
| 097 | Kiowa, KS |
| 099 | Labette, KS |
| 101 | Lane, KS |
| 103 | Leavenworth, KS |
| 105 | Lincoln, KS |
| 107 | Linn, KS |
| 109 | Logan, KS |
| 111 | Lyon, KS |
| 113 | McPherson, KS |
| 115 | Marion, KS |
| 117 | Marshall, KS |
| 119 | Meade, KS |
| 121 | Miami, KS |
| 123 | Mitchell, KS |
| 125 | Montgomery, KS |
| 127 | Morris, KS |
| 129 | Morton, KS |
| 131 | Nemaha, KS |
| 133 | Neosho, KS |
| 135 | Ness, KS |
| 137 | Norton, KS |
| 139 | Osage, KS |
| 141 | Osborne, KS |
| 143 | Ottawa, KS |
| 145 | Pawnee, KS |
| 147 | Phillips, KS |
| 149 | Pottawatomie, KS |
| 151 | Pratt, KS |
| 153 | Rawlins, KS |
| 155 | Reno, KS |
| 157 | Republic, KS |
| 159 | Rice, KS |
| 161 | Riley, KS |
| 163 | Rooks, KS |
| 165 | Rush, KS |
| 167 | Russell, KS |
| 169 | Saline, KS |
| 171 | Scott, KS |
| 173 | Sedgwick, KS |
| 175 | Seward, KS |
| 177 | Shawnee, KS |
| 179 | Sheridan, KS |
| 181 | Sherman, KS |
| 183 | Smith, KS |
| 185 | Stafford, KS |
| 187 | Stanton, KS |
| 189 | Stevens, KS |
| 191 | Sumner, KS |
| 193 | Thomas, KS |
| 195 | Trego, KS |
| 197 | Wabaunsee, KS |
| 199 | Wallace, KS |
| 201 | Washington, KS |
| 203 | Wichita, KS |
| 205 | Wilson, KS |
| 207 | Woodson, KS |
| 209 | Wyandotte, KS |
| KENTUCKY | |
| 001 | Adair, KY |
| 003 | Allen, KY |
| 005 | Anderson, KY |
| 007 | Ballard, KY |
| 009 | Barren, KY |
| 011 | Bath, KY |
| 013 | Bell, KY |
| 015 | Boone, KY |
| 017 | Bourbon, KY |
| 019 | Boyd, KY |
| 021 | Boyle, KY |
| 023 | Bracken, KY |
| 025 | Breathitt, KY |
| 027 | Breckinridge, KY |
| 029 | Bullitt, KY |
| 031 | Butler, KY |

TABLE 3-continued

| County-Level FIPS Code | County Name, State |
|---|---|
| 033 | Caldwell, KY |
| 035 | Calloway, KY |
| 037 | Campbell, KY |
| 039 | Carlisle, KY |
| 041 | Carroll, KY |
| 043 | Carter, KY |
| 045 | Casey, KY |
| 047 | Christian, KY |
| 049 | Clark, KY |
| 051 | Clay, KY |
| 053 | Clinton, KY |
| 055 | Crittenden, KY |
| 057 | Cumberland, KY |
| 059 | Daviess, KY |
| 061 | Edmonson, KY |
| 063 | Elliott, KY |
| 065 | Estill, KY |
| 067 | Fayette, KY |
| 069 | Fleming, KY |
| 071 | Floyd, KY |
| 073 | Franklin, KY |
| 075 | Fulton, KY |
| 077 | Gallatin, KY |
| 079 | Garrard, KY |
| 081 | Grant, KY |
| 083 | Graves, KY |
| 085 | Grayson, KY |
| 087 | Green, KY |
| 089 | Greenup, KY |
| 091 | Hancock, KY |
| 093 | Hardin, KY |
| 095 | Harlan, KY |
| 097 | Harrison, KY |
| 099 | Hart, KY |
| 101 | Henderson, KY |
| 103 | Henry, KY |
| 105 | Hickman, KY |
| 107 | Hopkins, KY |
| 109 | Jackson, KY |
| 111 | Jefferson, KY |
| 113 | Jessamine, KY |
| 115 | Johnson, KY |
| 117 | Kenton, KY |
| 119 | Knott, KY |
| 121 | Knox, KY |
| 123 | Larue, KY |
| 125 | Laurel, KY |
| 127 | Lawrence, KY |
| 129 | Lee, KY |
| 131 | Leslie, KY |
| 133 | Letcher, KY |
| 135 | Lewis, KY |
| 137 | Lincoln, KY |
| 139 | Livingston, KY |
| 141 | Logan, KY |
| 143 | Lyon, KY |
| 145 | McCracken, KY |
| 147 | McCreary, KY |
| 149 | McLean, KY |
| 151 | Madison, KY |
| 153 | Magoffin, KY |
| 155 | Marion, KY |
| 157 | Marshall, KY |
| 159 | Martin, KY |
| 161 | Mason, KY |
| 163 | Meade, KY |
| 165 | Menifee, KY |
| 167 | Mercer, KY |
| 169 | Metcalfe, KY |
| 171 | Monroe, KY |
| 173 | Montgomery, KY |
| 175 | Morgan, KY |
| 177 | Muhlenberg, KY |
| 179 | Nelson, KY |
| 181 | Nicholas, KY |
| 183 | Ohio, KY |
| 185 | Oldham, KY |
| 187 | Owen, KY |
| 189 | Owsley, KY |
| 191 | Pendleton, KY |
| 193 | Perry, KY |
| 195 | Pike, KY |
| 197 | Powell, KY |
| 199 | Pulaski, KY |
| 201 | Robertson, KY |
| 203 | Rockcastle, KY |
| 205 | Rowan, KY |
| 207 | Russell, KY |
| 209 | Scott, KY |
| 211 | Shelby, KY |
| 213 | Simpson, KY |
| 215 | Spencer, KY |
| 217 | Taylor, KY |
| 219 | Todd, KY |
| 221 | Trigg, KY |
| 223 | Trimble, KY |
| 225 | Union, KY |
| 227 | Warren, KY |
| 229 | Washington, KY |
| 231 | Wayne, KY |
| 233 | Webster, KY |
| 235 | Whitley, KY |
| 237 | Wolfe, KY |
| 239 | Woodford, KY |
| LOUISIANA | |
| 001 | Acadia, LA |
| 003 | Allen, LA |
| 005 | Ascension, LA |
| 007 | Assumption, LA |
| 009 | Avoyelles, LA |
| 011 | Beauregard, LA |
| 013 | Bienville, LA |
| 015 | Bossier, LA |
| 017 | Caddo, LA |
| 019 | Calcasieu, LA |
| 021 | Caldwell, LA |
| 023 | Cameron, LA |
| 025 | Catahoula, LA |
| 027 | Claiborne, LA |
| 029 | Concordia, LA |
| 031 | De Soto, LA |
| 033 | East Baton Rouge, LA |
| 035 | East Carroll, LA |
| 037 | East Feliciana, LA |
| 039 | Evangeline, LA |
| 041 | Franklin, LA |
| 043 | Grant, LA |
| 045 | Iberia, LA |
| 047 | Iberville, LA |
| 049 | Jackson, LA |
| 051 | Jefferson, LA |
| 053 | Jefferson Davis, LA |
| 055 | Lafayette, LA |
| 057 | Lafourche, LA |
| 059 | La Salle, LA |
| 061 | Lincoln, LA |
| 063 | Livingston, LA |
| 065 | Madison, LA |
| 067 | Morehouse, LA |
| 069 | Natchitoches, LA |
| 071 | Orleans, LA |
| 073 | Ouachita, LA |
| 075 | Plaquemines, LA |
| 077 | Pointe Coupee, LA |
| 079 | Rapides, LA |
| 081 | Red River, LA |
| 083 | Richland, LA |
| 085 | Sabine, LA |
| 087 | St. Bernard, LA |
| 089 | St. Charles, LA |
| 091 | St. Helena, LA |

TABLE 3-continued

| County-Level FIPS Code | County Name, State |
|---|---|
| 093 | St. James, LA |
| 095 | St. John the Baptist, LA |
| 097 | St. Landry, LA |
| 099 | St. Martin, LA |
| 101 | St. Mary, LA |
| 103 | St. Tammany, LA |
| 105 | Tangipahoa, LA |
| 107 | Tensas, LA |
| 109 | Terrebonne, LA |
| 111 | Union, LA |
| 113 | Vermilion, LA |
| 115 | Vernon, LA |
| 117 | Washington, LA |
| 119 | Webster, LA |
| 121 | West Baton Rouge, LA |
| 123 | West Carroll, LA |
| 125 | West Feliciana, LA |
| 127 | Winn, LA |
| MASSACHUSETTS | |
| 001 | Barnstable, MA |
| 003 | Berkshire, MA |
| 005 | Bristol, MA |
| 007 | Dukes, MA |
| 009 | Essex, MA |
| 011 | Franklin, MA |
| 013 | Hampden, MA |
| 015 | Hampshire, MA |
| 017 | Middlesex, MA |
| 019 | Nantucket, MA |
| 021 | Norfolk, MA |
| 023 | Plymouth, MA |
| 025 | Suffolk, MA |
| 027 | Worcester, MA |
| MARYLAND | |
| 001 | Allegany, MD |
| 003 | Anne Arundel, MD |
| 005 | Baltimore, MD |
| 009 | Calvert, MD |
| 011 | Caroline, MD |
| 013 | Carroll, MD |
| 015 | Cecil, MD |
| 017 | Charles, MD |
| 019 | Dorchester, MD |
| 021 | Frederick, MD |
| 023 | Garrett, MD |
| 025 | Harford, MD |
| 027 | Howard, MD |
| 029 | Kent, MD |
| 031 | Montgomery, MD |
| 033 | Prince George's, MD |
| 035 | Queen Anne's, MD |
| 037 | St. Mary's, MD |
| 039 | Somerset, MD |
| 041 | Talbot, MD |
| 043 | Washington, MD |
| 045 | Wicomico, MD |
| 047 | Worcester, MD |
| 510 | Baltimore city, MD |
| MAINE | |
| 001 | Androscoggin, ME |
| 003 | Aroostook, ME |
| 005 | Cumberland, ME |
| 007 | Franklin, ME |
| 009 | Hancock, ME |
| 011 | Kennebec, ME |
| 013 | Knox, ME |
| 015 | Lincoln, ME |
| 017 | Oxford, ME |
| 019 | Penobscot, ME |
| 021 | Piscataquis, ME |
| 023 | Sagadahoc, ME |
| 025 | Somerset, ME |
| 027 | Waldo, ME |
| 029 | Washington, ME |
| 031 | York, ME |
| MICHIGAN | |
| 001 | Alcona, MI |
| 003 | Alger, MI |
| 005 | Allegan, MI |
| 007 | Alpena, MI |
| 009 | Antrim, MI |
| 011 | Arenac, MI |
| 013 | Baraga, MI |
| 015 | Barry, MI |
| 017 | Bay, MI |
| 019 | Benzie, MI |
| 021 | Berrien, MI |
| 023 | Branch, MI |
| 025 | Calhoun, MI |
| 027 | Cass, MI |
| 029 | Charlevoix, MI |
| 031 | Cheboygan, MI |
| 033 | Chippewa, MI |
| 035 | Clare, MI |
| 037 | Clinton, MI |
| 039 | Crawford, MI |
| 041 | Delta, MI |
| 043 | Dickinson, MI |
| 045 | Eaton, MI |
| 047 | Emmet, MI |
| 049 | Genesee, MI |
| 051 | Gladwin, MI |
| 053 | Gogebic, MI |
| 055 | Grand Traverse, MI |
| 057 | Gratiot, MI |
| 059 | Hillsdale, MI |
| 061 | Houghton, MI |
| 063 | Huron, MI |
| 065 | Ingham, MI |
| 067 | Ionia, MI |
| 069 | Iosco, MI |
| 071 | Iron, MI |
| 073 | Isabella, MI |
| 075 | Jackson, MI |
| 077 | Kalamazoo, MI |
| 079 | Kalkaska, MI |
| 081 | Kent, MI |
| 083 | Keweenaw, MI |
| 085 | Lake, MI |
| 087 | Lapeer, MI |
| 089 | Leelanau, MI |
| 091 | Lenawee, MI |
| 093 | Livingston, MI |
| 095 | Luce, MI |
| 097 | Mackinac, MI |
| 099 | Macomb, MI |
| 101 | Manistee, MI |
| 103 | Marquette, MI |
| 105 | Mason, MI |
| 107 | Mecosta, MI |
| 109 | Menominee, MI |
| 111 | Midland, MI |
| 113 | Missaukee, MI |
| 115 | Monroe, MI |
| 117 | Montcalm, MI |
| 119 | Montmorency, MI |
| 121 | Muskegon, MI |
| 123 | Newaygo, MI |
| 125 | Oakland, MI |
| 127 | Oceana, MI |
| 129 | Ogemaw, MI |
| 131 | Ontonagon, MI |
| 133 | Osceola, MI |
| 135 | Oscoda, MI |
| 137 | Otsego, MI |
| 139 | Ottawa, MI |
| 141 | Presque Isle, MI |
| 143 | Roscommon, MI |

TABLE 3-continued

| County-Level FIPS Code | County Name, State |
|---|---|
| 145 | Saginaw, MI |
| 147 | St. Clair, MI |
| 149 | St. Joseph, MI |
| 151 | Sanilac, MI |
| 153 | Schoolcraft, MI |
| 155 | Shiawassee, MI |
| 157 | Tuscola, MI |
| 159 | Van Buren, MI |
| 161 | Washtenaw, MI |
| 163 | Wayne, MI |
| 165 | Wexford, MI |
| MINNESOTA | |
| 001 | Aitkin, MN |
| 003 | Anoka, MN |
| 005 | Becker, MN |
| 007 | Beltrami, MN |
| 009 | Benton, MN |
| 011 | Big Stone, MN |
| 013 | Blue Earth, MN |
| 015 | Brown, MN |
| 017 | Carlton, MN |
| 019 | Carver, MN |
| 021 | Cass, MN |
| 023 | Chippewa, MN |
| 025 | Chisago, MN |
| 027 | Clay, MN |
| 029 | Clearwater, MN |
| 031 | Cook, MN |
| 033 | Cottonwood, MN |
| 035 | Crow Wing, MN |
| 037 | Dakota, MN |
| 039 | Dodge, MN |
| 041 | Douglas, MN |
| 043 | Faribault, MN |
| 045 | Fillmore, MN |
| 047 | Freeborn, MN |
| 049 | Goodhue, MN |
| 051 | Grant, MN |
| 053 | Hennepin, MN |
| 055 | Houston, MN |
| 057 | Hubbard, MN |
| 059 | Isanti, MN |
| 061 | Itasca, MN |
| 063 | Jackson, MN |
| 065 | Kanabec, MN |
| 067 | Kandiyohi, MN |
| 069 | Kittson, MN |
| 071 | Koochiching, MN |
| 073 | Lac qui Parle, MN |
| 075 | Lake, MN |
| 077 | Lake of the Woods, MN |
| 079 | Le Sueur, MN |
| 081 | Lincoln, MN |
| 083 | Lyon, MN |
| 085 | McLeod, MN |
| 087 | Mahnomen, MN |
| 089 | Marshall, MN |
| 091 | Martin, MN |
| 093 | Meeker, MN |
| 095 | Mille Lacs, MN |
| 097 | Morrison, MN |
| 099 | Mower, MN |
| 101 | Murray, MN |
| 103 | Nicollet, MN |
| 105 | Nobles, MN |
| 107 | Norman, MN |
| 109 | Olmsted, MN |
| 111 | Otter Tail, MN |
| 113 | Pennington, MN |
| 115 | Pine, MN |
| 117 | Pipestone, MN |
| 119 | Polk, MN |
| 121 | Pope, MN |
| 123 | Ramsey, MN |
| 125 | Red Lake, MN |
| 127 | Redwood, MN |
| 129 | Renviile, MN |
| 131 | Rice, MN |
| 133 | Rock, MN |
| 135 | Roseau, MN |
| 137 | St. Louis, MN |
| 139 | Scott, MN |
| 141 | Sherburne, MN |
| 143 | Sibley, MN |
| 145 | Stearns, MN |
| 147 | Steele, MN |
| 149 | Stevens, MN |
| 151 | Swift, MN |
| 153 | Todd, MN |
| 155 | Traverse, MN |
| 157 | Wabasha, MN |
| 159 | Wadena, MN |
| 161 | Waseca, MN |
| 163 | Washington, MN |
| 165 | Watonwan, MN |
| 167 | Wilkin, MN |
| 169 | Winona, MN |
| 171 | Wright, MN |
| 173 | Yellow Medicine, MN |
| MISSOURI | |
| 001 | Adair, MO |
| 003 | Andrew, MO |
| 005 | Atchison, MO |
| 007 | Audrain, MO |
| 009 | Barry, MO |
| 011 | Barton, MO |
| 013 | Bates, MO |
| 015 | Benton, MO |
| 017 | Bollinger, MO |
| 019 | Boone, MO |
| 021 | Buchanan, MO |
| 023 | Butler, MO |
| 025 | Caldwell, MO |
| 027 | Callaway, MO |
| 029 | Camden, MO |
| 031 | Cape Girardeau, MO |
| 033 | Carroll, MO |
| 035 | Carter, MO |
| 037 | Cass, MO |
| 039 | Cedar, MO |
| 041 | Chariton, MO |
| 043 | Christian, MO |
| 045 | Clark, MO |
| 047 | Clay, MO |
| 049 | Clinton, MO |
| 051 | Cole, MO |
| 053 | Cooper, MO |
| 055 | Crawford, MO |
| 057 | Dade, MO |
| 059 | Dallas, MO |
| 061 | Daviess, MO |
| 063 | De Kalb, MO |
| 065 | Dent, MO |
| 067 | Douglas, MO |
| 069 | Dunklin, MO |
| 071 | Franklin, MO |
| 073 | Gasconade, MO |
| 075 | Gentry, MO |
| 077 | Greene, MO |
| 079 | Grundy, MO |
| 081 | Harrison, MO |
| 083 | Henry, MO |
| 085 | Hickory, MO |
| 087 | Holt, MO |
| 089 | Howard, MO |
| 091 | Howell, MO |
| 093 | Iron, MO |
| 095 | Jackson, MO |
| 097 | Jasper, MO |
| 099 | Jefferson, MO |

TABLE 3-continued

| County-Level FIPS Code | County Name, State |
|---|---|
| 101 | Johnson, MO |
| 103 | Knox, MO |
| 105 | Laclede, MO |
| 107 | Lafayette, MO |
| 109 | Lawrence, MO |
| 111 | Lewis, MO |
| 113 | Lincoln, MO |
| 115 | Linn, MO |
| 117 | Livingston, MO |
| 119 | McDonald, MO |
| 121 | Macon, MO |
| 123 | Madison, MO |
| 125 | Maries, MO |
| 127 | Marion, MO |
| 129 | Mercer, MO |
| 131 | Miller, MO |
| 133 | Mississippi, MO |
| 135 | Moniteau, MO |
| 137 | Monroe, MO |
| 139 | Montgomery, MO |
| 141 | Morgan, MO |
| 143 | New Madrid, MO |
| 145 | Newton, MO |
| 147 | Nodaway, MO |
| 149 | Oregon, MO |
| 151 | Osage, MO |
| 153 | Ozark, MO |
| 155 | Pemiscot, MO |
| 157 | Perry, MO |
| 159 | Pettis, MO |
| 161 | Phelps, MO |
| 163 | Pike, MO |
| 165 | Platte, MO |
| 167 | Polk, MO |
| 169 | Pulaski, MO |
| 171 | Putnam, MO |
| 173 | Ralls, MO |
| 175 | Randolph, MO |
| 177 | Ray, MO |
| 179 | Reynolds, MO |
| 181 | Ripley, MO |
| 183 | St. Charles, MO |
| 18S | St. Clair, MO |
| 186 | Ste. Genevieve, MO |
| 187 | St. Francois, MO |
| 189 | St. Louis, MO |
| 195 | Saline, MO |
| 197 | Schuyler, MO |
| 199 | Scotland, MO |
| 201 | Scott, MO |
| 203 | Shannon, MO |
| 205 | Shelby, MO |
| 207 | Stoddard, MO |
| 209 | Stone, MO |
| 211 | Sullivan, MO |
| 213 | Taney, MO |
| 215 | Texas, MO |
| 217 | Vernon, MO |
| 219 | Warren, MO |
| 221 | Washington, MO |
| 223 | Wayne, MO |
| 225 | Webster, MO |
| 227 | Worth, MO |
| 229 | Wright, MO |
| 510 | St. Louis city, MO |
| MISSISSIPPI | |
| 001 | Adams, MS |
| 003 | Alcorn, MS |
| 005 | Amite, MS |
| 007 | Attala, MS |
| 009 | Benton, MS |
| 011 | Bolivar, MS |
| 013 | Calhoun, MS |
| 015 | Carroll, MS |
| 017 | Chickasaw, MS |
| 019 | Choctaw, MS |
| 021 | Claiborne, MS |
| 023 | Clarke, MS |
| 025 | Clay, MS |
| 027 | Coahoma, MS |
| 029 | Copiah, MS |
| 031 | Covington, MS |
| 033 | DeSoto, MS |
| 035 | Forrest, MS |
| 037 | Franklin, MS |
| 039 | George, MS |
| 041 | Greene, MS |
| 043 | Grenada, MS |
| 045 | Hancock, MS |
| 047 | Harrison, MS |
| 049 | Hinds, MS |
| 051 | Holmes, MS |
| 053 | Humphreys, MS |
| 055 | Issaquena, MS |
| 057 | Itawamba, MS |
| 059 | Jackson, MS |
| 061 | Jasper, MS |
| 063 | Jefferson, MS |
| 065 | Jefferson Davis, MS |
| 067 | Jones, MS |
| 069 | Kemper, MS |
| 071 | Lafayette, MS |
| 073 | Lamar, MS |
| 075 | Lauderdale, MS |
| 077 | Lawrence, MS |
| 079 | Leake, MS |
| 081 | Lee, MS |
| 083 | Leflore, MS |
| 085 | Lincoln, MS |
| 087 | Lowndes, MS |
| 089 | Madison, MS |
| 091 | Marion, MS |
| 093 | Marshall, MS |
| 095 | Monroe, MS |
| 097 | Montgomery, MS |
| 099 | Neshoba, MS |
| 101 | Newton, MS |
| 103 | Noxubee, MS |
| 105 | Oktibbeha, MS |
| 107 | Panola, MS |
| 109 | Pearl River, MS |
| 111 | Perry, MS |
| 113 | Pike, MS |
| 115 | Pontotoc, MS |
| 117 | Prentiss, MS |
| 119 | Quitman, MS |
| 121 | Rankin, MS |
| 123 | Scott, MS |
| 125 | Sharkey, MS |
| 127 | Simpson, MS |
| 129 | Smith, MS |
| 131 | Stone, MS |
| 133 | Sunflower, MS |
| 135 | Tallahatchie, MS |
| 137 | Tate, MS |
| 139 | Tippah, MS |
| 141 | Tishomingo, MS |
| 143 | Tunica, MS |
| 145 | Union, MS |
| 147 | Walthall, MS |
| 149 | Warren, MS |
| 151 | Washington, MS |
| 153 | Wayne, MS |
| 155 | Webster, MS |
| 157 | Wilkinson, MS |
| 159 | Winston, MS |
| 161 | Yalobusha, MS |
| 163 | Yazoo, MS |

TABLE 3-continued

| County-Level FIPS Code | County Name, State |
|---|---|
| MONTANA | |
| 001 | Beaverhead, MT |
| 003 | Big Horn, MT |
| 005 | Blaine, MT |
| 007 | Broadwater, MT |
| 009 | Carbon, MT |
| 011 | Carter, MT |
| 013 | Cascade, MT |
| 015 | Chouteau, MT |
| 017 | Custer, MT |
| 019 | Daniels, MT |
| 021 | Dawson, MT |
| 023 | Deer Lodge, MT |
| 025 | Fallon, MT |
| 027 | Fergus, MT |
| 029 | Flathead, MT |
| 031 | Gallatin, MT |
| 033 | Garfield, MT |
| 035 | Glacier, MT |
| 037 | Golden Valley, MT |
| 039 | Granite, MT |
| 041 | Hill, MT |
| 043 | Jefferson, MT |
| 045 | Judith Basin, MT |
| 047 | Lake, MT |
| 049 | Lewis and Clark, MT |
| 051 | Liberty, MT |
| 053 | Lincoln, MT |
| 055 | McCone, MT |
| 057 | Madison, MT |
| 059 | Meagher, MT |
| 061 | Mineral, MT |
| 063 | Missoula, MT |
| 065 | Musselshell, MT |
| 067 | Park, MT |
| 069 | Petroleum, MT |
| 071 | Phillips, MT |
| 073 | Pondera, MT |
| 075 | Powder River, MT |
| 077 | Powell, MT |
| 079 | Prairie, MT |
| 081 | Ravalli, MT |
| 083 | Richland, MT |
| 085 | Roosevelt, MT |
| 087 | Rosebud, MT |
| 089 | Sanders, MT |
| 091 | Sheridan, MT |
| 093 | Silver Bow, MT |
| 095 | Stillwater, MT |
| 097 | Sweet Grass, MT |
| 099 | Teton, MT |
| 101 | Toole, MT |
| 103 | Treasure, MT |
| 105 | Valley, MT |
| 107 | Wheatland, MT |
| 109 | Wibaux, MT |
| 111 | Yellowstone, MT |
| 113 | Yellowstone National Park, MT |
| NORTH CAROLINA | |
| 001 | Alamance, NC |
| 003 | Alexander, NC |
| 005 | Alleghany, NC |
| 007 | Anson, NC |
| 009 | Ashe, NC |
| 011 | Avery, NC |
| 013 | Beaufort, NC |
| 015 | Bertie, NC |
| 017 | Bladen, NC |
| 019 | Brunswick, NC |
| 021 | Buncombe, NC |
| 023 | Burke, NC |
| 025 | Cabarrus, NC |
| 027 | Caldwell, NC |
| 029 | Camden, NC |
| 031 | Carteret, NC |
| 033 | Caswell, NC |
| 035 | Catawba, NC |
| 037 | Chatham, NC |
| 039 | Cherokee, NC |
| 041 | Chowan, NC |
| 043 | Clay, NC |
| 045 | Cleveland, NC |
| 047 | Columbus, NC |
| 049 | Craven, NC |
| 051 | Cumberland, NC |
| 053 | Currituck, NC |
| 055 | Dare, NC |
| 057 | Davidson, NC |
| 059 | Davie, NC |
| 061 | Duplin, NC |
| 063 | Durham, NC |
| 065 | Edgecombe, NC |
| 067 | Forsyth, NC |
| 069 | Franklin, NC |
| 071 | Gaston, NC |
| 073 | Gates, NC |
| 075 | Graham, NC |
| 077 | Granville, NC |
| 079 | Greene, NC |
| 081 | Guilford, NC |
| 083 | Halifax, NC |
| 085 | Harnett, NC |
| 087 | Haywood, NC |
| 089 | Henderson, NC |
| 091 | Hertford, NC |
| 093 | Hoke, NC |
| 095 | Hyde, NC |
| 097 | Iredell, NC |
| 099 | Jackson, NC |
| 101 | Johnston, NC |
| 103 | Jones, NC |
| 105 | Lee, NC |
| 107 | Lenoir, NC |
| 109 | Lincoln, NC |
| 111 | McDowell, NC |
| 113 | Macon, NC |
| 115 | Madison, NC |
| 117 | Martin, NC |
| 119 | Mecklenburg, NC |
| 121 | Mitchell, NC |
| 123 | Montgomery, NC |
| 125 | Moore, NC |
| 127 | Nash, NC |
| 129 | New Hanover, NC |
| 131 | Northampton, NC |
| 133 | Onslow, NC |
| 135 | Orange, NC |
| 137 | Pamlico, NC |
| 139 | Pasquotank, NC |
| 141 | Pender, NC |
| 143 | Perquimans, NC |
| 145 | Person, NC |
| 147 | Pitt, NC |
| 149 | Polk, NC |
| 151 | Randolph, NC |
| 153 | Richmond, NC |
| 155 | Robeson, NC |
| 157 | Rockingham, NC |
| 159 | Rowan, NC |
| 161 | Rutherford, NC |
| 163 | Sampson, NC |
| 165 | Scotland, NC |
| 167 | Stanly, NC |
| 169 | Stokes, NC |
| 171 | Surry, NC |
| 173 | Swain, NC |
| 175 | Transylvania, NC |
| 177 | Tyrrell, NC |
| 179 | Union, NC |
| 181 | Vance, NC |

TABLE 3-continued

| County-Level FIPS Code | County Name, State |
|---|---|
| 183 | Wake, NC |
| 185 | Warren, NC |
| 187 | Washington, NC |
| 189 | Watauga, NC |
| 191 | Wayne, NC |
| 193 | Wilkes, NC |
| 195 | Wilson, NC |
| 197 | Yadkin, NC |
| 199 | Yancey, NC |
| NORTH DAKOTA | |
| 001 | Adams, ND |
| 003 | Barnes, ND |
| 005 | Benson, ND |
| 007 | Billings, ND |
| 009 | Bottineau, ND |
| 011 | Bowman, ND |
| 013 | Burke, ND |
| 015 | Burleigh, ND |
| 017 | Cass, ND |
| 019 | Cavalier, ND |
| 021 | Dickey, ND |
| 023 | Divide, ND |
| 025 | Dunn, ND |
| 027 | Eddy, ND |
| 029 | Emmons, ND |
| 031 | Foster, ND |
| 033 | Golden Valley, ND |
| 035 | Grand Forks, ND |
| 037 | Grant, ND |
| 039 | Griggs, ND |
| 041 | Hettinger, ND |
| 043 | Kidder, ND |
| 045 | La Moure, ND |
| 047 | Logan, ND |
| 049 | McHenry, ND |
| 051 | McIntosh, ND |
| 053 | McKenzie, ND |
| 055 | McLean, ND |
| 057 | Mercer, ND |
| 059 | Morton, ND |
| 061 | Mountrail, ND |
| 063 | Nelson, ND |
| 065 | Oliver, ND |
| 067 | Pembina, ND |
| 069 | Pierce, ND |
| 071 | Ramsey, ND |
| 073 | Ransom, ND |
| 075 | Renville, ND |
| 077 | Richland, ND |
| 079 | Rolette, ND |
| 081 | Sargent, ND |
| 083 | Sheridan, ND |
| 085 | Sioux, ND |
| 087 | Slope, ND |
| 089 | Stark, ND |
| 091 | Steele, ND |
| 093 | Stutsman, ND |
| 095 | Towner, ND |
| 097 | Traill, ND |
| 099 | Walsh, ND |
| 101 | Ward, ND |
| 103 | Wells, ND |
| 105 | Williams, ND |
| NEBRASKA | |
| 001 | Adams, NE |
| 003 | Antelope, NE |
| 005 | Arthur, NE |
| 007 | Banner, NE |
| 009 | Blaine, NE |
| 011 | Boone, NE |
| 013 | Box Butte, NE |
| 015 | Boyd, NE |
| 017 | Brown, NE |
| 019 | Buffalo, NE |
| 021 | Burt, NE |
| 023 | Butler, NE |
| 025 | Cass, NE |
| 027 | Cedar, NE |
| 029 | Chase, NE |
| 031 | Cherry, NE |
| 033 | Cheyenne, NE |
| 035 | Clay, NE |
| 037 | Colfax, NE |
| 039 | Cuming, NE |
| 041 | Custer, NE |
| 043 | Dakota, NE |
| 045 | Dawes, NE |
| 047 | Dawson, NE |
| 049 | Deuel, NE |
| 051 | Dixon, NE |
| 053 | Dodge, NE |
| 055 | Douglas, NE |
| 057 | Dundy, NE |
| 059 | Fillmore, NE |
| 061 | Franklin, NE |
| 063 | Frontier, NE |
| 065 | Furnas, NE |
| 067 | Gage, NE |
| 069 | Garden, NE |
| 071 | Garfield, NE |
| 073 | Gosper, NE |
| 075 | Grant, NE |
| 077 | Greeley, NE |
| 079 | Hall, NE |
| 081 | Hamilton, NE |
| 083 | Harlan, NE |
| 085 | Hayes, NE |
| 087 | Hitchcock, NE |
| 089 | Holt, NE |
| 091 | Hooker, NE |
| 093 | Howard, NE |
| 095 | Jefferson, NE |
| 097 | Johnson, NE |
| 099 | Kearney, NE |
| 101 | Keith, NE |
| 103 | Keya Paha, NE |
| 105 | Kimball, NE |
| 107 | Knox, NE |
| 109 | Lancaster, NE |
| 111 | Lincoln, NE |
| 113 | Logan, NE |
| 115 | Loup, NE |
| 117 | McPherson, NE |
| 119 | Madison, NE |
| 121 | Merrick, NE |
| 123 | Morrill, NE |
| 125 | Nance, NE |
| 127 | Nemaha, NE |
| 129 | Nuckolls, NE |
| 131 | Otoe, NE |
| 133 | Pawnee, NE |
| 135 | Perkins, NE |
| 137 | Phelps, NE |
| 139 | Pierce, NE |
| 141 | Platte, NE |
| 143 | Polk, NE |
| 145 | Red Willow, NE |
| 147 | Richardson, NE |
| 149 | Rock, NE |
| 151 | Saline, NE |
| 153 | Sarpy, NE |
| 155 | Saunders, NE |
| 157 | Scotts Bluff, NE |
| 159 | Seward, NE |
| 161 | Sheridan, NE |
| 163 | Sherman, NE |
| 165 | Sioux, NE |
| 167 | Stanton, NE |
| 169 | Thayer, NE |
| 171 | Thomas, NE |

TABLE 3-continued

| County-Level FIPS Code | County Name, State |
|---|---|
| 173 | Thurston, NE |
| 175 | Valley, NE |
| 177 | Washington, NE |
| 179 | Wayne, NE |
| 181 | Webster, NE |
| 183 | Wheeler, NE |
| 185 | York, NE |
| NEW HAMPSHIRE | |
| 001 | Belknap, NH |
| 003 | Carroll, NH |
| 005 | Cheshire, NH |
| 007 | Coos, NH |
| 009 | Grafton, NH |
| 011 | Hillsborough, NH |
| 013 | Merrimack, NH |
| 015 | Rockingham, NH |
| 017 | Strafford, NH |
| 019 | Sullivan, NH |
| NEW JERSEY | |
| 001 | Atlantic, NJ |
| 003 | Bergen, NJ |
| 005 | Burlington, NJ |
| 007 | Camden, NJ |
| 009 | Cape May, NJ |
| 011 | Cumberland, NJ |
| 013 | Essex, NJ |
| 015 | Gloucester, NJ |
| 017 | Hudson, NJ |
| 019 | Hunterdon, NJ |
| 021 | Mercer, NJ |
| 023 | Middlesex, NJ |
| 025 | Monmouth, NJ |
| 027 | Morris, NJ |
| 029 | Ocean, NJ |
| 031 | Passaic, NJ |
| 033 | Salem, NJ |
| 035 | Somerset, NJ |
| 037 | Sussex, NJ |
| 039 | Union, NJ |
| 041 | Warren, NJ |
| NEW MEXICO | |
| 001 | Bernalillo, NM |
| 003 | Catron, NM |
| 005 | Chaves, NM |
| 006 | Cibola, NM |
| 007 | Colfax, NM |
| 009 | Curry, NM |
| 011 | De Baca, NM |
| 013 | Dona Ana, NM |
| 015 | Eddy, NM |
| 017 | Grant, NM |
| 019 | Guadalupe, NM |
| 021 | Harding, NM |
| 023 | Hidalgo, NM |
| 025 | Lea, NM |
| 027 | Lincoln, NM |
| 028 | Los Alamos, NM |
| 029 | Luna, NM |
| 031 | McKinley, NM |
| 033 | Mora, NM |
| 035 | Otero, NM |
| 037 | Quay, NM |
| 039 | Rio Arriba, NM |
| 041 | Roosevelt, NM |
| 043 | Sandoval, NM |
| 045 | San Juan, NM |
| 047 | San Miguel, NM |
| 049 | Santa Fe, NM |
| 051 | Sierra, NM |
| 053 | Socorro, NM |
| 055 | Taos, NM |
| 057 | Torrance, NM |
| 059 | Union, NM |
| 061 | Valencia, NM |
| NEVADA | |
| 001 | Churchill, NV |
| 003 | Clark, NV |
| 005 | Douglas, NV |
| 007 | Elko, NV |
| 009 | Esmeralda, NV |
| 011 | Eureka, NV |
| 013 | Humboldt, NV |
| 015 | Lander, NV |
| 017 | Lincoln, NV |
| 019 | Lyon, NV |
| 021 | Mineral, NV |
| 023 | Nye, NV |
| 027 | Pershing, NV |
| 029 | Storey, NV |
| 031 | Washoe, NV |
| 033 | White Pine, NV |
| 510 | Carson City city, NV |
| NEW YORK | |
| 001 | Albany, NY |
| 003 | Allegany, NY |
| 005 | Bronx, NY |
| 007 | Broome, NY |
| 009 | Cattaraugus, NY |
| 011 | Cayuga, NY |
| 013 | Chautauqua, NY |
| 015 | Chemung, NY |
| 017 | Chenango, NY |
| 019 | Clinton, NY |
| 021 | Columbia, NY |
| 023 | Cortland, NY |
| 025 | Delaware, NY |
| 027 | Dutchess, NY |
| 029 | Erie, NY |
| 031 | Essex, NY |
| 033 | Franklin, NY |
| 035 | Fulton, NY |
| 037 | Genesee, NY |
| 039 | Greene, NY |
| 041 | Hamilton, NY |
| 043 | Herkimer, NY |
| 045 | Jefferson, NY |
| 047 | Kings, NY |
| 049 | Lewis, NY |
| 051 | Livingston, NY |
| 053 | Madison, NY |
| 055 | Monroe, NY |
| 057 | Montgomery, NY |
| 059 | Nassau, NY |
| 061 | New York, NY |
| 063 | Niagara, NY |
| 065 | Oneida, NY |
| 067 | Onondaga, NY |
| 069 | Ontario, NY |
| 071 | Orange, NY |
| 073 | Orleans, NY |
| 075 | Oswego, NY |
| 077 | Otsego, NY |
| 079 | Putnam, NY |
| 081 | Queens, NY |
| 083 | Rensselaer, NY |
| 085 | Richmond, NY |
| 087 | Rockland, NY |
| 089 | St. Lawrence, NY |
| 091 | Saratoga, NY |
| 093 | Schenectady, NY |
| 095 | Schoharie, NY |
| 097 | Schuyler, NY |
| 099 | Seneca, NY |
| 101 | Steuben, NY |
| 103 | Suffolk, NY |
| 105 | Sullivan, NY |
| 107 | Tioga, NY |

TABLE 3-continued

| County-Level FIPS Code | County Name, State |
|---|---|
| 109 | Tompkins, NY |
| 111 | Ulster, NY |
| 113 | Warren, NY |
| 115 | Washington, NY |
| 117 | Wayne, NY |
| 119 | Westchester, NY |
| 121 | Wyoming, NY |
| 123 | Yates, NY |
| OHIO | |
| 001 | Adams, OH |
| 003 | Allen, OH |
| 005 | Ashland, OH |
| 007 | Ashtabula, OH |
| 009 | Athens, OH |
| 011 | Auglaize, OH |
| 013 | Belmont, OH |
| 015 | Brown, OH |
| 017 | Butler, OH |
| 019 | Carroll, OH |
| 021 | Champaign, OH |
| 023 | Clark, OH |
| 025 | Clermont, OH |
| 027 | Clinton, OH |
| 029 | Columbiana, OH |
| 031 | Coshocton, OH |
| 033 | Crawford, OH |
| 035 | Cuyahoga, OH |
| 037 | Darke, OH |
| 039 | Defiance, OH |
| 041 | Delaware, OH |
| 043 | Erie, OH |
| 045 | Fairfield, OH |
| 047 | Fayette, OH |
| 049 | Franklin, OH |
| 051 | Fulton, OH |
| 053 | Gallia, OH |
| 055 | Geauga, OH |
| 057 | Greene, OH |
| 059 | Guernsey, OH |
| 061 | Hamilton, OH |
| 063 | Hancoak, OH |
| 065 | Hardin, OH |
| 067 | Harrison, OH |
| 069 | Henry, OH |
| 071 | Highland, OH |
| 073 | Hocking, OH |
| 075 | Holmes, OH |
| 077 | Huron, OH |
| 079 | Jackson, OH |
| 081 | Jefferson, OH |
| 083 | Knox, OH |
| 085 | Lake, OH |
| 087 | Lawrence, OH |
| 089 | Licking, OH |
| 091 | Logan, OH |
| 093 | Lorain, OH |
| 095 | Lucas, OH |
| 097 | Madison, OH |
| 099 | Mahoning, OH |
| 101 | Marion, OH |
| 103 | Medina, OH |
| 105 | Meigs, OH |
| 107 | Mercer, OH |
| 109 | Miami, OH |
| 111 | Monroe, OH |
| 113 | Montgomery, OH |
| 115 | Morgan, OH |
| 117 | Morrow, OH |
| 119 | Muskingum, OH |
| 121 | Noble, OH |
| 123 | Ottawa, OH |
| 125 | Paulding, OH |
| 127 | Perry, OH |
| 129 | Pickaway, OH |
| 131 | Pike, OH |
| 133 | Portage, OH |
| 135 | Preble, OH |
| 137 | Putnam, OH |
| 139 | Richland, OH |
| 141 | Ross, OH |
| 143 | Sandusky, OH |
| 145 | Scioto, OH |
| 147 | Seneca, OH |
| 149 | Shelby, OH |
| 151 | Stark, OH |
| 153 | Summit, OH |
| 155 | Trumbull, OH |
| 157 | Tuscarawas, OH |
| 159 | Union, OH |
| 161 | Van Wert, OH |
| 163 | Vinton, OH |
| 165 | Warren, OH |
| 167 | Washington, OH |
| 169 | Wayne, OH |
| 171 | Williams, OH |
| 173 | Wood, OH |
| 175 | Wyandot, OH |
| OKLAHOMA | |
| 001 | Adair, OK |
| 003 | Alfalfa, OK |
| 005 | Atoka, OK |
| 007 | Beaver, OK |
| 009 | Beckham, OK |
| 011 | Blaine, OK |
| 013 | Bryan, OK |
| 015 | Caddo, OK |
| 017 | Canadian, OK |
| 019 | Carter, OK |
| 021 | Cherokee, OK |
| 023 | Choctaw, OK |
| 025 | Cimarron, OK |
| 027 | Cleveland, OK |
| 029 | Coal, OK |
| 031 | Comanche, OK |
| 033 | Cotton, OK |
| 035 | Craig, OK |
| 037 | Creek, OK |
| 039 | Custer, OK |
| 041 | Delaware, OK |
| 043 | Dewey, OK |
| 045 | Ellis, OK |
| 047 | Garfield, OK |
| 049 | Garvin, OK |
| 051 | Grady, OK |
| 053 | Grant, OK |
| 055 | Greer, OK |
| 057 | Harmon, OK |
| 059 | Harper, OK |
| 061 | Haskell, OK |
| 063 | Hughes, OK |
| 065 | Jackson, OK |
| 067 | Jefferson, OK |
| 069 | Johnston, OK |
| 071 | Kay, OK |
| 073 | Kingfisher, OK |
| 075 | Kiowa, OK |
| 077 | Latimer, OK |
| 079 | Le Flore, OK |
| 081 | Lincoln, OK |
| 083 | Logan, OK |
| 085 | Love, OK |
| 087 | McClain, OK |
| 089 | McCurtain, OK |
| 091 | McIntosh, OK |
| 093 | Major, OK |
| 095 | Marshall, OK |
| 097 | Mayes, OK |
| 099 | Murray, OK |
| 101 | Muskogee, OK |
| 103 | Noble, OK |

TABLE 3-continued

| County-Level FIPS Code | County Name, State |
|---|---|
| 105 | Nowata, OK |
| 107 | Okfuskee, OK |
| 109 | Oklahoma, OK |
| 111 | Okmulgee, OK |
| 113 | Osage, OK |
| 115 | Ottawa, OK |
| 117 | Pawnee, OK |
| 119 | Payne, OK |
| 121 | Pittsburg, OK |
| 123 | Pontotoc, OK |
| 125 | Pottawatomie, OK |
| 127 | Pushmataha, OK |
| 129 | Roger Mills, OK |
| 131 | Rogers, OK |
| 133 | Seminole, OK |
| 135 | Sequoyah, OK |
| 137 | Stephens, OK |
| 139 | Texas, OK |
| 141 | Tillman, OK |
| 143 | Tulsa, OK |
| 145 | Wagoner, OK |
| 147 | Washington, OK |
| 149 | Washita, OK |
| 151 | Woods, OK |
| 153 | Woodward, OK |
| OREGON | |
| 001 | Baker, OR |
| 003 | Benton, OR |
| 005 | Clackamas, OR |
| 007 | Clatsop, OR |
| 009 | Columbia, OR |
| 011 | Coos, OR |
| 013 | Crook, OR |
| 015 | Curry, OR |
| 017 | Deschutes, OR |
| 019 | Douglas, OR |
| 021 | Gilliam, OR |
| 023 | Grant, OR |
| 025 | Harney, OR |
| 027 | Hood River, OR |
| 029 | Jackson, OR |
| 031 | Jefferson, OR |
| 033 | Josephine, OR |
| 035 | Klamath, OR |
| 037 | Lake, OR |
| 039 | Lane, OR |
| 041 | Lincoln, OR |
| 043 | Linn, OR |
| 045 | Malheur, OR |
| 047 | Marion, OR |
| 049 | Morrow, OR |
| 051 | Multnomah, OR |
| 053 | Polk, OR |
| 055 | Sherman, OR |
| 057 | Tillamook, OR |
| 059 | Umatilla, OR |
| 061 | Union, OR |
| 063 | Wallowa, OR |
| 065 | Wasco, OR |
| 067 | Washington, OR |
| 069 | Wheeler, OR |
| 071 | Yamhill, OR |
| PENNSYLVANIA | |
| 001 | Adams, PA |
| 003 | Allegheny, PA |
| 005 | Armstrong, PA |
| 007 | Beaver, PA |
| 009 | Bedford, PA |
| 011 | Berks, PA |
| 013 | Blair, PA |
| 015 | Bradford, PA |
| 017 | Bucks, PA |
| 019 | Butler, PA |
| 021 | Cambria, PA |
| 023 | Cameron, PA |
| 025 | Carbon, PA |
| 027 | Centre, PA |
| 029 | Chester, PA |
| 031 | Clarion, PA |
| 033 | Clearfield, PA |
| 035 | Clinton, PA |
| 037 | Columbia, PA |
| 039 | Crawford, PA |
| 041 | Cumberland, PA |
| 043 | Dauphin, PA |
| 045 | Delaware, PA |
| 047 | Elk, PA |
| 049 | Erie, PA |
| 051 | Fayette, PA |
| 053 | Forest, PA |
| 055 | Franklin, PA |
| 057 | Fulton, PA |
| 059 | Greene, PA |
| 061 | Huntingdon, PA |
| 063 | Indiana, PA |
| 065 | Jefferson, PA |
| 067 | Juniata, PA |
| 069 | Lackawanna, PA |
| 071 | Lancaster, PA |
| 073 | Lawrence, PA |
| 075 | Lebanon, PA |
| 077 | Lehigh, PA |
| 079 | Luzerne, PA |
| 081 | Lycoming, PA |
| 083 | McKean, PA |
| 085 | Mercer, PA |
| 087 | Mifflin, PA |
| 089 | Monroe, PA |
| 091 | Montgomery, PA |
| 093 | Montour, PA |
| 095 | Northampton, PA |
| 097 | Northumberland, PA |
| 099 | Perry, PA |
| 101 | Philadelphia, PA |
| 103 | Pike, PA |
| 105 | Potter, PA |
| 107 | Schuylkill, PA |
| 109 | Snyder, PA |
| 111 | Somerset, PA |
| 113 | Sullivan, PA |
| 115 | Susquehanna, PA |
| 117 | Tioga, PA |
| 119 | Union, PA |
| 121 | Venango, PA |
| 123 | Warren, PA |
| 125 | Washington, PA |
| 127 | Wayne, PA |
| 129 | Westmoreland, PA |
| 131 | Wyoming, PA |
| 133 | York, PA |
| RHODE ISLAND | |
| 001 | Bristol, RI |
| 003 | Kent, RI |
| 005 | Newport, RI |
| 007 | Providence, RI |
| 009 | Washington, RI |
| SOUTH CAROLINA | |
| 001 | Abbeville, SC |
| 003 | Aiken, SC |
| 005 | Allendale, SC |
| 007 | Anderson, SC |
| 009 | Bamberg, SC |
| 011 | Barnwell, SC |
| 013 | Beaufort, SC |
| 015 | Berkeley, SC |
| 017 | Calhoun, SC |
| 019 | Charleston, SC |
| 021 | Cherokee, SC |

TABLE 3-continued

| County-Level FIPS Code | County Name, State |
|---|---|
| 023 | Chester, SC |
| 025 | Chesterfield, SC |
| 027 | Clarendon, SC |
| 029 | Colleton, SC |
| 031 | Darlington, SC |
| 033 | Dillon, SC |
| 035 | Dorchester, SC |
| 037 | Edgefield, SC |
| 039 | Fairfield, SC |
| 041 | Florence, SC |
| 043 | Georgetown, SC |
| 045 | Greenville, SC |
| 047 | Greenwood, SC |
| 049 | Hampton, SC |
| 051 | Horry, SC |
| 053 | Jasper, SC |
| 055 | Kershaw, SC |
| 057 | Lancaster, SC |
| 059 | Laurens, SC |
| 061 | Lee, SC |
| 063 | Lexington, SC |
| 065 | McCormick, SC |
| 067 | Marion, SC |
| 069 | Marlboro, SC |
| 071 | Newberry, SC |
| 073 | Oconee, SC |
| 075 | Orangeburg, SC |
| 077 | Pickens, SC |
| 079 | Richland, SC |
| 081 | Saluda, SC |
| 083 | Spartanburg, SC |
| 085 | Sumter, SC |
| 087 | Union, SC |
| 089 | Williamsburg, SC |
| 091 | York, SC |
| SOUTH DAKOTA | |
| 003 | Aurora, SD |
| 005 | Beadle, SD |
| 007 | Bennett, SD |
| 009 | Bon Homme, SD |
| 011 | Brookings, SD |
| 013 | Brown, SD |
| 015 | Brule, SD |
| 017 | Buffalo, SD |
| 019 | Butte, SD |
| 021 | Campbell, SD |
| 023 | Charles Mix, SD |
| 025 | Clark, SD |
| 027 | Clay, SD |
| 029 | Codington, SD |
| 031 | Corson, SD |
| 033 | Custer, SD |
| 035 | Davison, SD |
| 037 | Day, SD |
| 039 | Deuel, SD |
| 041 | Dewey, SD |
| 043 | Douglas, SD |
| 045 | Edmunds, SD |
| 047 | Fall River, SD |
| 049 | Faulk, SD |
| 051 | Grant, SD |
| 053 | Gregory, SD |
| 055 | Haakon, SD |
| 057 | Hamlin, SD |
| 059 | Hand, SD |
| 061 | Hanson, SD |
| 063 | Harding, SD |
| 065 | Hughes, SD |
| 067 | Hutchinson, SD |
| 069 | Hyde, SD |
| 071 | Jackson, SD |
| 073 | Jerauld, SD |
| 075 | Jones, SD |
| 077 | Kingsbury, SD |
| 079 | Lake, SD |

TABLE 3-continued

| County-Level FIPS Code | County Name, State |
|---|---|
| 081 | Lawrence, SD |
| 083 | Lincoln, SD |
| 085 | Lyman, SD |
| 087 | McCook, SD |
| 089 | McPherson, SD |
| 091 | Marshall, SD |
| 093 | Meade, SD |
| 095 | Mellette, SD |
| 097 | Miner, SD |
| 099 | Minnehaha, SD |
| 101 | Moody, SD |
| 103 | Pennington, SD |
| 105 | Perkins, SD |
| 107 | Potter, SD |
| 109 | Roberts, SD |
| 111 | Sanborn, SD |
| 113 | Shannon, SD |
| 115 | Spink, SD |
| 117 | Stanley, SD |
| 119 | Sully, SD |
| 121 | Todd, SD |
| 123 | Tripp, SD |
| 12S | Turner, SD |
| 127 | Union, SD |
| 129 | Walworth, SD |
| 135 | Yankton, SD |
| 137 | Ziebach, SD |
| TENNESSEE | |
| 001 | Anderson, TN |
| 003 | Bedford, TN |
| 005 | Benton, TN |
| 007 | Bledsoe, TN |
| 009 | Blount, TN |
| 011 | Bradley, TN |
| 013 | Campbell, TN |
| 015 | Cannon, TN |
| 017 | Carroll, TN |
| 019 | Carter, TN |
| 021 | Cheatham, TN |
| 023 | Chester, TN |
| 025 | Claiborne, TN |
| 027 | Clay, TN |
| 029 | Cocke, Th |
| 031 | Coffee, TN |
| 033 | Crockett, TN |
| 035 | Cumberland, TN |
| 037 | Davidson, TN |
| 039 | Decatur, TN |
| 041 | DeKalb, TN |
| 043 | Dickson, TN |
| 045 | Dyer, TN |
| 047 | Fayette, TN |
| 049 | Fentress, TN |
| 051 | Franklin, TN |
| 053 | Gibson, TN |
| 055 | Giles, TN |
| 057 | Grainger, TN |
| 059 | Greene, TN |
| 061 | Grundy, TN |
| 063 | Hamblen, TN |
| 065 | Hamilton, TN |
| 067 | Hancock, TN |
| 069 | Hardeman, TN |
| 071 | Hardin, TN |
| 073 | Hawkins, TN |
| 075 | Haywood, TN |
| 077 | Henderson, Th |
| 079 | Henry, TN |
| 081 | Hickman, TN |
| 083 | Houston, TN |
| 085 | Humphreys, TN |
| 087 | Jackson, TN |
| 089 | Jefferson, TN |
| 091 | Johnson, TN |
| 093 | Knox, TN |

TABLE 3-continued

| County-Level FIPS Code | County Name, State |
|---|---|
| 095 | Lake, TN |
| 097 | Lauderdale, TN |
| 099 | Lawrence, TN |
| 101 | Lewis, TN |
| 103 | Lincoln, TN |
| 105 | Loudon, TN |
| 107 | McMinn, TN |
| 109 | McNairy, TN |
| 111 | Macon, TN |
| 113 | Madison, TN |
| 115 | Marion, TN |
| 117 | Marshall, TN |
| 119 | Maury, TN |
| 121 | Meigs, TN |
| 123 | Monroe, TN |
| 125 | Montgomery, TN |
| 127 | Moore, TN |
| 129 | Morgan, TN |
| 131 | Obion, TN |
| 133 | Overton, TN |
| 135 | Perry, TN |
| 137 | Pickett, TN |
| 139 | Polk, TN |
| 141 | Putnam, TN |
| 143 | Rhea, TN |
| 145 | Roane, TN |
| 147 | Robertson, TN |
| 149 | Rutherford, TN |
| 151 | Scott, TN |
| 153 | Sequatchie, TN |
| 155 | Sevier, TN |
| 157 | Shelby, TN |
| 159 | Smith, TN |
| 161 | Stewart, TN |
| 163 | Sullivan, TN |
| 165 | Sumner, TN |
| 167 | Tipton, TN |
| 169 | Trousdale, TN |
| 171 | Unicoi, TN |
| 173 | Union, TN |
| 175 | Van Buren, TN |
| 177 | Warren, TN |
| 179 | Washington, TN |
| 181 | Wayne, TN |
| 183 | Weakley, TN |
| 185 | White, TN |
| 187 | Williamson, TN |
| 189 | Wilson, TN |
| TEXAS | |
| 001 | Anderson, TX |
| 003 | Andrews, TX |
| 005 | Angelina, TX |
| 007 | Aransas, TX |
| 009 | Archer, TX |
| 011 | Armstrong, TX |
| 013 | Atascosa, TX |
| 015 | Austin, TX |
| 017 | Bailey, TX |
| 019 | Bandera, TX |
| 021 | Bastrop, TX |
| 023 | Baylor, TX |
| 025 | Bee, TX |
| 027 | Bell, TX |
| 029 | Bexar, TX |
| 031 | Blanco, TX |
| 033 | Borden, TX |
| 035 | Bosque, TX |
| 037 | Bowie, TX |
| 039 | Brazoria, TX |
| 041 | Brazos, TX |
| 043 | Brewster, TX |
| 045 | Briscoe, TX |
| 047 | Brooks, TX |
| 049 | Brown, TX |
| 051 | Burleson, TX |

TABLE 3-continued

| County-Level FIPS Code | County Name, State |
|---|---|
| 053 | Burnet, TX |
| 055 | Caldwell, TX |
| 057 | Calhoun, TX |
| 059 | Callahan, TX |
| 061 | Cameron, TX |
| 063 | Camp, TX |
| 065 | Carson, TX |
| 067 | Cass, TX |
| 069 | Castro, TX |
| 071 | Chambers, TX |
| 073 | Cherokee, TX |
| 075 | Childress, TX |
| 077 | Clay, TX |
| 079 | Cochran, TX |
| 081 | Coke, TX |
| 083 | Coleman, TX |
| 085 | Collin, TX |
| 087 | Collingsworth, TX |
| 089 | Colorado, TX |
| 091 | Comal, TX |
| 093 | Comanche, TX |
| 095 | Concho, TX |
| 097 | Cooke, TX |
| 099 | Coryell, TX |
| 101 | Cottle, TX |
| 103 | Crane, TX |
| 105 | Crockett, TX |
| 107 | Crosby, TX |
| 109 | Culberson, TX |
| 111 | Dallam, TX |
| 113 | Dallas, TX |
| 115 | Dawson, TX |
| 117 | Deaf Smith, TX |
| 119 | Delta, TX |
| 121 | Denton, TX |
| 123 | De Witt, TX |
| 125 | Dickens, TX |
| 127 | Dimmit, TX |
| 129 | Donley, TX |
| 131 | Duval, TX |
| 133 | Eastland, TX |
| 135 | Ector, TX |
| 137 | Edwards, TX |
| 139 | Ellis, TX |
| 141 | El Paso, TX |
| 143 | Erath, TX |
| 145 | Falls, TX |
| 147 | Fannin, TX |
| 149 | Fayette, TX |
| 151 | Fisher, TX |
| 153 | Floyd, TX |
| 155 | Foard, TX |
| 157 | Fort Bend, TX |
| 159 | Franklin, TX |
| 161 | Freestone, TX |
| 163 | Frio, TX |
| 165 | Gaines, TX |
| 167 | Galveston, TX |
| 169 | Garza, TX |
| 171 | Gillespie, TX |
| 173 | Glasscock, TX |
| 175 | Goliad, TX |
| 177 | Gonzales, TX |
| 179 | Gray, TX |
| 181 | Grayson, TX |
| 183 | Gregg, TX |
| 185 | Grimes, TX |
| 187 | Guadalupe, TX |
| 189 | Hale, TX |
| 191 | Hall, TX |
| 193 | Hamilton, TX |
| 195 | Hansford, TX |
| 197 | Hardeman, TX |
| 199 | Hardin, TX |
| 201 | Harris, TX |
| 203 | Harrison, TX |

TABLE 3-continued

| County-Level FIPS Code | County Name, State |
|---|---|
| 205 | Hartley, TX |
| 207 | Haskell, TX |
| 209 | Hays, TX |
| 211 | Hemphill, TX |
| 213 | Henderson, TX |
| 215 | Hidalgo, TX |
| 217 | Hill, TX |
| 219 | Hockley, TX |
| 221 | Hood, TX |
| 223 | Hopkins, TX |
| 225 | Houston, TX |
| 227 | Howard, TX |
| 229 | Hudspeth, TX |
| 231 | Hunt, TX |
| 233 | Hutchinson, TX |
| 235 | Irion, TX |
| 237 | Jack, TX |
| 239 | Jackson, TX |
| 241 | Jasper, TX |
| 243 | Jeff Davis, TX |
| 245 | Jefferson, TX |
| 247 | Jim Hogg, TX |
| 249 | Jim Wells, TX |
| 251 | Johnson, TX |
| 253 | Jones, TX |
| 255 | Karnes, TX |
| 257 | Kaufman, TX |
| 259 | Kendall, TX |
| 261 | Kenedy, TX |
| 263 | Kent, TX |
| 265 | Kerr, TX |
| 267 | Kimble, TX |
| 269 | King, TX |
| 271 | Kinney, TX |
| 273 | Kleberg, TX |
| 275 | Knox, TX |
| 277 | Lamar, TX |
| 279 | Lamb, TX |
| 281 | Lampasas, TX |
| 283 | La Salle, TX |
| 285 | Lavaca, TX |
| 287 | Lee, TX |
| 289 | Leon, TX |
| 291 | Liberty, TX |
| 293 | Limestone, TX |
| 295 | Lipscomb, TX |
| 297 | Live Oak, TX |
| 299 | Llano, TX |
| 301 | Loving, TX |
| 303 | Lubbock, TX |
| 305 | Lynn, TX |
| 307 | McCulloch, TX |
| 309 | McLennan, TX |
| 311 | McMullen, TX |
| 313 | Madison, TX |
| 315 | Marion, TX |
| 317 | Martin, TX |
| 319 | Mason, TX |
| 321 | Matagorda, TX |
| 323 | Maverick, TX |
| 325 | Medina, TX |
| 327 | Menard, TX |
| 329 | Midland, TX |
| 331 | Milam, TX |
| 333 | Mills, TX |
| 335 | Mitchell, TX |
| 337 | Montague, TX |
| 339 | Montgomery, TX |
| 341 | Moore, TX |
| 343 | Morris, TX |
| 345 | Motley, TX |
| 347 | Nacogdoches, TX |
| 349 | Navarro, TX |
| 351 | Newton, TX |
| 353 | Nolan, TX |
| 355 | Nueces, TX |
| 357 | Ochiltree, TX |
| 359 | Oldham, TX |
| 361 | Orange, TX |
| 363 | Palo Pinto, TX |
| 365 | Panola, TX |
| 367 | Parker, TX |
| 369 | Parmer, TX |
| 371 | Pecos, TX |
| 373 | Polk, TX |
| 375 | Potter, TX |
| 377 | Presidio, TX |
| 379 | Rains, TX |
| 381 | Randall, TX |
| 383 | Reagan, TX |
| 385 | Real, TX |
| 387 | Red River, TX |
| 389 | Reeves, TX |
| 391 | Refugio, TX |
| 393 | Roberts, TX |
| 395 | Robertson, TX |
| 397 | Rockwall, TX |
| 399 | Runnels, TX |
| 401 | Rusk, TX |
| 403 | Sabine, TX |
| 405 | San Augustine, TX |
| 407 | San Jacinto, TX |
| 409 | San Patricio, TX |
| 411 | San Saba, TX |
| 413 | Schleicher, TX |
| 415 | Scurry, TX |
| 417 | Shackelford, TX |
| 419 | Shelby, TX |
| 421 | Sherman, TX |
| 423 | Smith, TX |
| 425 | Somervell, TX |
| 427 | Starr, TX |
| 429 | Stephens, TX |
| 431 | Sterling, TX |
| 433 | Stonewall, TX |
| 435 | Sutton, TX |
| 437 | Swisher, TX |
| 439 | Tarrant, TX |
| 441 | Taylor, TX |
| 443 | Terrell, TX |
| 445 | Terry, TX |
| 447 | Throckmorton, TX |
| 449 | Titus, TX |
| 451 | Tom Green, TX |
| 453 | Travis, TX |
| 455 | Trinity, TX |
| 457 | Tyler, TX |
| 459 | Upshur, TX |
| 461 | Upton, TX |
| 463 | Uvalde, TX |
| 465 | Val Verde, TX |
| 467 | Van Zandt, TX |
| 469 | Victoria, TX |
| 471 | Walker, TX |
| 473 | Waller, TX |
| 475 | Ward, TX |
| 477 | Washington, TX |
| 479 | Webb, TX |
| 481 | Wharton, TX |
| 483 | Wheeler, TX |
| 485 | Wichita, TX |
| 487 | Wilbarger, TX |
| 489 | Willacy, TX |
| 491 | Williamson, TX |
| 493 | Wilson, TX |
| 495 | Winkler, TX |
| 497 | Wise, TX |
| 499 | Wood, TX |
| 501 | Yoakum, TX |
| 503 | Young, TX |
| 505 | Zapata, TX |
| 507 | Zavala, TX |

TABLE 3-continued

| County-Level FIPS Code | County Name, State |
|---|---|
| UTAH | |
| 001 | Beaver, UT |
| 003 | Box Elder, UT |
| 005 | Cache, UT |
| 007 | Carbon, UT |
| 009 | Daggett, UT |
| 011 | Davis, UT |
| 013 | Duchesne, UT |
| 015 | Emery, UT |
| 017 | Garfield, UT |
| 019 | Grand, UT |
| 021 | Iron, UT |
| 023 | Juab, UT |
| 025 | Kane, UT |
| 027 | Millard, UT |
| 029 | Morgan, UT |
| 031 | Piute, UT |
| 033 | Rich, UT |
| 035 | Salt Lake, UT |
| 037 | San Juan, UT |
| 039 | Sanpete, UT |
| 041 | Sevier, UT |
| 043 | Summit, UT |
| 045 | Tooele, UT |
| 047 | Uintah, UT |
| 049 | Utah, UT |
| 051 | Wasatch, UT |
| 053 | Washington, UT |
| 055 | Wayne, UT |
| 057 | Weber, UT |
| VIRGINIA | |
| 001 | Accomack, VA |
| 003 | Albemarle, VA |
| 005 | Alleghany, VA |
| 007 | Amelia, VA |
| 009 | Amherst, VA |
| 011 | Appomattox, VA |
| 013 | Arlington, VA |
| 015 | Augusta, VA |
| 017 | Bath, VA |
| 019 | Bedford, VA |
| 021 | Bland, VA |
| 023 | Botetourt, VA |
| 025 | Brunswick, VA |
| 027 | Buchanan, VA |
| 029 | Buckingham, VA |
| 031 | Campbell, VA |
| 033 | Caroline, VA |
| 035 | Carroll, VA |
| 036 | Charles City, VA |
| 037 | Charlotte, VA |
| 041 | Chesterfield, VA |
| 043 | Clarke, VA |
| 045 | Craig, VA |
| 047 | Culpeper, VA |
| 049 | Cumberland, VA |
| 051 | Dickenson, VA |
| 053 | Dinwiddie, VA |
| 057 | Essex, VA |
| 059 | Fairfax, VA |
| 061 | Fauquier, VA |
| 063 | Floyd, VA |
| 065 | Fluvanna, VA |
| 067 | Franklin, VA |
| 069 | Frederick, VA |
| 071 | Giles, VA |
| 073 | Gloucester, VA |
| 075 | Goochland, VA |
| 077 | Grayson, VA |
| 079 | Greene, VA |
| 081 | Greensville, VA |
| 083 | Halifax, VA |
| 085 | Hanover, VA |
| 087 | Henrico, VA |
| 089 | Henry, VA |
| 091 | Highland, VA |
| 093 | Isle of Wight, VA |
| 095 | James City, VA |
| 097 | King and Queen, VA |
| 099 | King George, VA |
| 101 | King William, VA |
| 103 | Lancaster, VA |
| 105 | Lee, VA |
| 107 | Loudoun, VA |
| 109 | Louisa, VA |
| 111 | Lunenburg, VA |
| 113 | Madison, VA |
| 115 | Mathews, VA |
| 117 | Mecklenburg, VA |
| 119 | Middlesex, VA |
| 121 | Montgomery, VA |
| 125 | Nelson, VA |
| 127 | New Kent, VA |
| 131 | Northampton, VA |
| 133 | Northumberland, VA |
| 135 | Nottoway, VA |
| 137 | Orange, VA |
| 139 | Page, VA |
| 141 | Patrick, VA |
| 143 | Pittsylvania, VA |
| 145 | Powhatan, VA |
| 147 | Prince Edward, VA |
| 149 | Prince George, VA |
| 153 | Prince William, VA |
| 155 | Pulaski, VA |
| 157 | Rappahannock, VA |
| 159 | Richmond, VA |
| 161 | Roanoke, VA |
| 163 | Rockbridge, VA |
| 165 | Rockingham, VA |
| 167 | Russell, VA |
| 169 | Scott, VA |
| 171 | Shenandoah, VA |
| 173 | Smyth, VA |
| 175 | Southampton, VA |
| 177 | Spotsylvania, VA |
| 179 | Stafford, VA |
| 181 | Surry, VA |
| 183 | Sussex, VA |
| 185 | Tazewell, VA |
| 187 | Warren, VA |
| 191 | Washington, VA |
| 193 | Westmoreland, VA |
| 195 | Wise, VA |
| 197 | Wythe, VA |
| 199 | York, VA |
| 510 | Alexandria, VA |
| 515 | Bedford, VA |
| 520 | Bristol, VA |
| 530 | Buena Vista, VA |
| 540 | Charlottesville, VA |
| 550 | Chesapeake, VA |
| 560 | Clifton Forge, VA |
| 570 | Colonial Heights, VA |
| 580 | Covington, VA |
| 590 | Danville, VA |
| 595 | Emporia, VA |
| 600 | Fairfax, VA |
| 610 | Falls Church, VA |
| 620 | Franklin, VA |
| 630 | Fredericksburg, VA |
| 640 | Galax, VA |
| 650 | Hampton, VA |
| 660 | Harrisonburg, VA |
| 670 | Hopewell, VA |
| 678 | Lexington, VA |
| 680 | Lynchburg, VA |
| 683 | Manassas, VA |
| 685 | Manassas Park, VA |
| 690 | Martinsville, VA |

TABLE 3-continued

| County-Level FIPS Code | County Name, State |
|---|---|
| 700 | Newport News, VA |
| 710 | Norfolk, VA |
| 720 | Norton, VA |
| 730 | Petersburg, VA |
| 735 | Poquoson, VA |
| 740 | Portsmouth, VA |
| 750 | Radford, VA |
| 760 | Richmond, VA |
| 770 | Roanoke, VA |
| 775 | Salem, VA |
| 780 | South Boston, VA |
| 790 | Staunton, VA |
| 800 | Suffolk, VA |
| 810 | Virginia Beach, VA |
| 820 | Waynesboro, VA |
| 830 | Williamsburg, VA |
| 840 | Winchester, VA |
| VERMONT | |
| 001 | Addison, VT |
| 003 | Bennington, VT |
| 005 | Caledonia, VT |
| 007 | Chittenden, VT |
| 009 | Essex, VT |
| 011 | Franklin, VT |
| 013 | Grand Isle, VT |
| 015 | Lamoille, VT |
| 017 | Orange, VT |
| 019 | Orleans, VT |
| 021 | Rutland, VT |
| 023 | Washington, VT |
| 025 | Windham, VT |
| 027 | Windsor, VT |
| WASHINGTON | |
| 001 | Adams, WA |
| 003 | Asotin, WA |
| 005 | Benton, WA |
| 007 | Chelan, WA |
| 009 | Clallam, WA |
| 011 | Clark, WA |
| 013 | Columbia, WA |
| 015 | Cowlitz, WA |
| 017 | Douglas, WA |
| 019 | Ferry, WA |
| 021 | Franklin, WA |
| 023 | Garfield, WA |
| 025 | Grant, WA |
| 027 | Grays Harbor, WA |
| 029 | Island, WA |
| 031 | Jefferson, WA |
| 033 | King, WA |
| 035 | Kitsap, WA |
| 037 | Kittitas, WA |
| 039 | Klickitat, WA |
| 041 | Lewis, WA |
| 043 | Lincoln, WA |
| 045 | Mason, WA |
| 047 | Okanogan, WA |
| 049 | Pacific, WA |
| 051 | Pend Oreille, WA |
| 053 | Pierce, WA |
| 055 | San Juan, WA |
| 057 | Skagit, WA |
| 059 | Skamania, WA |
| 061 | Snohomish, WA |
| 063 | Spokane, WA |
| 065 | Stevens, WA |
| 067 | Thurston, WA |
| 069 | Wahkiakum, WA |
| 071 | Walla Walla, WA |
| 073 | Whatcom, WA |
| 075 | Whitman, WA |
| 077 | Yakima, WA |

TABLE 3-continued

| County-Level FIPS Code | County Name, State |
|---|---|
| WISCONSIN | |
| 001 | Adams, WI |
| 003 | Ashland, WI |
| 005 | Barron, WI |
| 007 | Bayfield, WI |
| 009 | Brown, WI |
| 011 | Buffalo, WI |
| 013 | Burnett, WI |
| 015 | Calumet, WI |
| 017 | Chippewa, WI |
| 019 | Clark, WI |
| 021 | Columbia, WI |
| 023 | Crawford, WI |
| 025 | Dane, WI |
| 027 | Dodge, WI |
| 029 | Door, WI |
| 031 | Douglas, WI |
| 033 | Dunn, WI |
| 035 | Eau Claire, WI |
| 037 | Florence, WI |
| 039 | Fond du Lac, WI |
| 041 | Forest, WI |
| 043 | Grant, WI |
| 045 | Green, WI |
| 047 | Green Lake, WI |
| 049 | Iowa, WI |
| 051 | Iron, WI |
| 053 | Jackson, WI |
| 055 | Jefferson, WI |
| 057 | Juneau, WI |
| 059 | Kenosha, WI |
| 061 | Kewaunee, WI |
| 063 | La Crosse, WI |
| 065 | Lafayette, WI |
| 067 | Langlade, WI |
| 069 | Lincoln, WI |
| 071 | Manitowoc, WI |
| 073 | Marathon, WI |
| 075 | Marinette, WI |
| 077 | Marquette, WI |
| 078 | Menominee, WI |
| 079 | Milwaukee, WI |
| 081 | Monroe, WI |
| 083 | Oconto, WI |
| 085 | Oneida, WI |
| 087 | Outagamie, WI |
| 089 | Ozaukee, WI |
| 091 | Pepin, WI |
| 093 | Pierce, WI |
| 095 | Polk, WI |
| 097 | Portage, WI |
| 099 | Price, WI |
| 101 | Racine, WI |
| 103 | Richland, WI |
| 105 | Rock, WI |
| 107 | Rusk, WI |
| 109 | St. Croix, WI |
| 111 | Sauk, WI |
| 113 | Sawyer, WI |
| 115 | Shawano, WI |
| 117 | Sheboygan, WI |
| 119 | Taylor, WI |
| 121 | Trempealeau, WI |
| 123 | Vernon, WI |
| 125 | Vilas, WI |
| 127 | Walworth, WI |
| 129 | Wasburn, WI |
| 131 | Washington, WI |
| 133 | Waukesha, WI |
| 135 | Waupaca, WI |
| 137 | Waushara, WI |
| 139 | Winnebago, WI |
| 141 | Wood, WI |

TABLE 3-continued

| County-Level FIPS Code | County Name, State |
|---|---|
| WEST VIRGINIA | |
| 001 | Barbour, WV |
| 003 | Berkeley, WV |
| 005 | Boone, WV |
| 007 | Braxton, WV |
| 009 | Brooke, WV |
| 011 | Cabell, WV |
| 013 | Calhoun, WV |
| 015 | Clay, WV |
| 017 | Doddridge, WV |
| 019 | Fayette, WV |
| 021 | Gilmer, WV |
| 023 | Grant, WV |
| 025 | Greenbrier, WV |
| 027 | Hampshire, WV |
| 029 | Hancock, WV |
| 031 | Hardy, WV |
| 033 | Harrison, WV |
| 035 | Jackson, WV |
| 037 | Jefferson, WV |
| 039 | Kanawha, WV |
| 041 | Lewis, WV |
| 043 | Lincoln, WV |
| 045 | Logan, WV |
| 047 | McDowell, WV |
| 049 | Marion, WV |
| 051 | Marshall, WV |
| 053 | Mason, WV |
| 055 | Mercer, WV |
| 057 | Mineral, WV |
| 059 | Mingo, WV |
| 061 | Monongalia, WV |
| 063 | Monroe, WV |
| 065 | Morgan, Wv |
| 067 | Nicholas, WV |
| 069 | Ohio, WV |
| 071 | Pendleton, WV |
| 073 | Pleasants, WV |
| 075 | Pocahontas, WV |
| 077 | Preston, WV |
| 079 | Putnam, WV |
| 081 | Raleigh, WV |
| 083 | Randolph, WV |
| 085 | Ritchie, WV |
| 087 | Roane, WV |
| 089 | Summers, WV |
| 091 | Taylor, WV |
| 093 | Tucker, WV |
| 09S | Tyler, WV |
| 097 | Upshur, WV |
| 099 | Wayne, WV |
| 101 | Webster, WV |
| 103 | Wetzel, WV |
| 105 | Wirt, WV |
| 107 | Wood, WV |
| 109 | Wyoming, WV |
| WYOMING | |
| 001 | Albany, WY |
| 003 | Big Horn, WY |
| 005 | Campbell, WY |
| 007 | Carbon, WY |
| 009 | Converse, WY |
| 011 | Crook, WY |
| 013 | Fremont, WY |
| 015 | Goshen, WY |
| 017 | Hot Springs, WY |
| 019 | Johnson, WY |
| 021 | Laramie, WY |
| 023 | Lincoln, WY |
| 025 | Natrona, WY |
| 027 | Niobrara, WY |
| 029 | Park, WY |
| 031 | Platte, WY |
| 033 | Sheridan, WY |
| 035 | Sublette, WY |
| 037 | Sweetwater, WY |
| 039 | Teton, WY |
| 041 | Uinta, WY |
| 043 | Washakie, WY |
| 045 | Weston, WY |

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the invention is to cover all modifications, equivalents, and alternative falling within the spirit and scope of the invention as defined by the appended claims. For example, while it is shown and described to equip an animal with a carrier device carrying the unique universal identification character sequence (UUICS) of the present invention, it is also contemplated (and within the scope of the present invention) that this UUICS information may be provided on the animal without the use of a carrier, such as by tattooing the UUICS information on the animal.

What is claimed is:

1. A method of identifying animals, comprising the steps of:

(a) providing a universal identification character sequence including a first block of characters representing a primary geographic location, a second block of characters representing a secondary geographic location within said primary geographic location, a third block of characters representing a tertiary geographic location within said secondary geographic location, a fourth block of characters representing a quaternary geographic location within said tertiary geographic location within which an animal is disposed, and a fifth block of characters representing a unique identifier for said animal within said quaternary geographic location; and (b) equipping each animal within said quaternary geographic location with a carrier carrying a unique universal identification character sequence for said animal.

2. The method of identifying animals as set forth in claim 1 and further, wherein said first block of characters within said universal identification character sequence comprises a multiple character code, and wherein said primary geographic location is a country.

3. The method of identifying animals as set forth in claim 2 and further, wherein said second block of characters within said universal identification character sequence comprises a multiple character code, and wherein said secondary geographic location is a state or province within said country.

4. The method of identifying animals as set forth in claim 3 and further, wherein said third block of characters within said universal identification character sequence comprises a multiple character code, and wherein said tertiary geographic location is a county or municipality within said state or province.

5. The method of identifying animals as set forth in claim 4 and further, wherein said fourth block of characters within said universal identification character sequence comprises a multiple character code, and wherein said quaternary geographic location is one of a premises or herd within said county or municipality.

6. The method of identifying animals as set forth in claim 5 and further, wherein said a fifth block of characters within said universal identification character sequence comprises a multiple character code.

7. The method of identifying animals as set forth in claim 6 and further, wherein said multiple character codes of said first block of characters, said second block of characters, said third block of characters, said fourth block of characters, and said fifth block of characters within said universal identification character sequence comprises at least one of a numeric code, an alphabetical code, and an alphanumeric code.

8. The method of identifying animals as set forth in claim 1, comprising the further step of providing a optional block of characters within said universal identification character sequence said representing a characteristic of said animal within said quaternary geographic location.

9. The method of identifying animals as set forth in claim 8 and further, wherein said optional block of characters representing a characteristic of said animal comprises at least one of a numeric code, an alphabetical code, and an alpha-numeric code representing one of animal type and animal class.

10. The method of identifying animals as set forth in claim 1 and further, wherein said unique universal identification character sequence for each animal is represented in at least one of machine-readable form, human-readable form, and electronically-readable form.

11. The method of identifying animals as set forth in claim 1 and further, wherein step (b) involves providing said carrier as at least one of a tag and a transponder carrying said unique universal identification character sequence.

12. The method of identifying animals as set forth in claim 1 and further, wherein step (b) involves providing said carrier as a tag assembly coupled to said animal, wherein said tag assembly includes a transponder and an attachment assembly for attaching said tag assembly to said animal.

13. The method of identifying animals as set forth in claim 12 and further, wherein said transponder comprises a substrate having an antenna and microchip circuit for transmitting said unique universal identification character sequence.

14. The method of identifying animals as set forth in claim 13 and further, wherein said transponder is capable of transmitting said unique universal identification character sequence at a frequency in the range from 125 KHz to 2.5 GHz.

15. A method of identifying animals, comprising the steps of:
(a) assigning a first block of characters to an animal representing a primary geographic location wherein said animal is disposed;
(b) assigning a second block of characters to said animal representing a secondary geographic location within said primary geographic location wherein said animal is disposed;
(c) assigning a third block of characters to said animal representing a tertiary geographic location within said secondary geographic location wherein said animal is disposed;
(d) assigning a fourth block of characters to said animal representing a quaternary geographic location within said tertiary geographic location wherein said animal is disposed;
(e) assigning a fifth block of characters to said animal representing a unique identifier for said animal disposed within said quaternary geographic location;
(f) combining the characters in steps (a)–(e) to produce a unique universal identification character sequence for said animal within said quaternary geographic location; and
(g) equipping said animal with a carrier carrying said unique universal identification character sequence for said animal.

16. The method of identifying animals as set forth in claim 15 and further, wherein said first block of characters within said universal identification character sequence comprises a multiple character code, and wherein said primary geographic location is a country.

17. The method of identifying animals as set forth in claim 16 and further, wherein said second block of characters within said universal identification character sequence comprises a multiple character code, and wherein said secondary geographic location is a state or province within said country.

18. The method of identifying animals as set forth in claim 17 and further, wherein said third block of characters within said universal identification character sequence comprises a multiple character code, and wherein said tertiary geographic location is a county or municipality within said state or province.

19. The method of identifying animals as set forth in claim 18 and further, wherein said fourth block of characters within said universal identification character sequence comprises a multiple character code, and wherein said quaternary geographic location is one of a premises or herd within said county or municipality.

20. The method of identifying animals as set forth in claim 19 and further, wherein said a fifth block of characters within said universal identification character sequence comprises a multiple character code.

21. The method of identifying animals as set forth in claim 20 and further, wherein said multiple character codes of said first block of characters, said second block of characters, said third block of characters, said fourth block of characters, and said fifth block of characters within said universal identification character sequence comprises at least one of a numeric code, an alphabetical code, and an alphanumeric code.

22. The method of identifying animals as set forth in claim 15, comprising the further step (h) of providing an optional block of characters within said universal identification character sequence representing a characteristic of said animal within said quaternary geographic location.

23. The method of identifying animals as set forth in claim 22 and further, wherein said optional block of characters comprises at least one of a numeric code, an alphabetical code, and an alpha-numeric code representing one of animal type and animal class.

24. The method of identifying animals as set forth in claim 15 and further, wherein said unique universal identification character sequence for said animal is represented in at least one of machine-readable form, human-readable form, and electronically-readable form.

25. The method of identifying animals as set forth in claim 15 and further, wherein step (g) involves providing said carrier as at least one of a tag and a transponder carrying said unique universal identification character sequence.

26. The method of identifying animals as set forth in claim 15 and further, wherein step (g) involves providing said carrier as a tag assembly coupled to said animal, wherein said tag assembly includes a transponder and an attachment assembly for attaching said tag assembly to said animal.

27. The method of identifying animals as set forth in claim 26 and further, wherein said transponder comprises a substrate having an antenna and microchip circuit for transmitting said unique universal identification character sequence.

28. The method of identifying animals as set forth in claim 27 and further, wherein said transponder is capable of transmitting said unique universal identification character sequence at a frequency in the range from 125 KHz to 2.5 GHz.

29. A method of identifying animals, wherein said animals are disposed within a quaternary geographic location which forms part of a tertiary geographic location which forms part of a secondary geographic location which forms part of a primary geographic location, the method comprising the steps of:
  (a) providing a unique universal identification character sequence for each animal within said quaternary geographic location; and
  (b) equipping each of said animals with a carrier carrying said unique universal identification character sequence.

30. The method of identifying animals as set forth in claim 29 and further, wherein step (b) involves providing said carrier as at least one of a tag and a transponder carrying said unique universal identification character sequence.

31. The method of identifying animals as set forth in claim 29 and further, wherein step (b) involves providing said carrier as a tag assembly coupled to said animal, wherein said tag assembly includes a transponder and an attachment assembly for attaching said tag assembly to said animal.

32. The method of identifying animals as set forth in claim 31 and further, wherein said transponder comprises a substrate having an antenna and microchip circuit for transmitting said unique universal identification character sequence.

33. The method of identifying animals as set forth in claim 32 and further, wherein said transponder is capable of transmitting said unique universal identification character sequence at a frequency in the range from 125 KHz to 2.5 GHz.

34. The method of identifying animals as set forth in claim 29 and further, wherein step (a) involves providing said universal identification character sequence to include a first block of characters representing said primary geographic location, a second block of characters representing said secondary geographic location within said primary geographic location, a third block of characters representing said tertiary geographic location within said secondary geographic location, a fourth block of characters representing said quaternary geographic location within said tertiary geographic location within which said animals are disposed, and a fifth block of characters representing a unique identifier for each said animal within said quaternary geographic location.

* * * * *